(12) United States Patent
Stec et al.

(10) Patent No.: US 9,277,196 B2
(45) Date of Patent: Mar. 1, 2016

(54) SYSTEMS AND METHODS FOR BACKWARD COMPATIBLE HIGH DYNAMIC RANGE/WIDE COLOR GAMUT VIDEO CODING AND RENDERING

(71) Applicant: DDD IP Ventures, Ltd., Road Town, Tortola (VG)

(72) Inventors: Kevin John Stec, Los Angeles, CA (US); Peshala Vishvajith Pahalawatta, Glendale, CA (US)

(73) Assignee: DDD IP Ventures, Ltd., Tortola (VG)

( * ) Notice: Subject to any disclaimer, the term of this patent is extended or adjusted under 35 U.S.C. 154(b) by 0 days.

(21) Appl. No.: 14/626,647

(22) Filed: Feb. 19, 2015

(65) Prior Publication Data

US 2015/0237322 A1  Aug. 20, 2015

Related U.S. Application Data

(60) Provisional application No. 61/942,013, filed on Feb. 19, 2014.

(51) Int. Cl.
*H04N 9/77* (2006.01)
*H04N 11/20* (2006.01)
*H04N 11/24* (2006.01)
*H04N 11/02* (2006.01)
*H04N 19/34* (2014.01)
*H04N 5/20* (2006.01)
*H04N 9/68* (2006.01)

(52) U.S. Cl.
CPC . *H04N 9/77* (2013.01); *H04N 5/20* (2013.01); *H04N 9/68* (2013.01); *H04N 11/002* (2013.01); *H04N 11/02* (2013.01); *H04N 19/34* (2014.11)

(58) Field of Classification Search
CPC .......... H04N 9/68; H04N 9/77; H04N 11/002
USPC ......... 348/708, 453, 678, 630, 441, 631, 687, 348/673; 345/603, 589, 590
See application file for complete search history.

(56) References Cited

U.S. PATENT DOCUMENTS

2013/0114000 A1* 5/2013 Atkins ................ H04N 5/20
348/708
2013/0148029 A1* 6/2013 Gish .................. G09G 5/02
348/708

* cited by examiner

*Primary Examiner* — Jefferey Harold
*Assistant Examiner* — Jean W Desir
(74) *Attorney, Agent, or Firm* — Knobbe Martens Olson & Bear, LLP

(57) ABSTRACT

A method to encode high dynamic range and wide color gamut video content with a backward compatible base layer. The base layer may be an HDTV or UHDTV program with Rec.709 colorimetry coded with AVC/H.264 or HEVC/H.265. The coding method provides information for properly rendering the content on displays with a wide range of color and brightness capabilities.

20 Claims, 10 Drawing Sheets

SYSTEMS AND METHODS FOR BACKWARD COMPATIBLE HIGH DYNAMIC RANGE/WIDE COLOR GAMUT VIDEO CODING AND RENDERING

CROSS REFERENCE TO RELATED APPLICATIONS

This application claims priority under 35 U.S.C. §119(e) to U.S. Provisional Application No. 61/942,013, entitled "SYSTEMS AND METHODS FOR BACKWARD COMPATIBLE HIGH DYNAMIC RANGE/WIDE COLOR GAMUT VIDEO CODING AND RENDERING," filed Feb. 19, 2014, the entirety of which is hereby incorporated by reference.

TECHNICAL FIELD

The described technology generally relates to video coding and rendering. More specifically, the disclosure is directed to systems and methods for backward compatible high dynamic range/wide color gamut video coding and rendering.

BACKGROUND

The ability to create and display video content is constantly improving up to the limits of human perception. Current standards for compressing and encoding video, such as those produced by the Moving Picture Experts Group ("MPEG"), have limitations on the dynamic range and the color gamut that may be coded and delivered to a consumer display device. As such, these standards produce video content with a dynamic range and color gamut that is below the capabilities of most of the displays being sold today. It would be advantageous to deliver video content that included both the standard limited range and the full range such that the video content could be readily mapped to fit the capabilities of the display device, taking a given viewing environment into account.

SUMMARY

Various implementations of systems, methods and devices within the scope of the appended claims each have several aspects, no single one of which is solely responsible for the desirable attributes described herein. In this regard, embodiments of the present invention may be embodied in many different forms and should not be construed as being limited to embodiments set forth herein. Without limiting the scope of the appended claims, some prominent features are described herein.

An apparatus for coding video content is provided. The apparatus comprises a memory unit storing base layer video content of a first dynamic range and a first color gamut. The memory unit also stores enhanced video content of a second dynamic range and a second color gamut. The second dynamic range is higher than the first dynamic range and the second color gamut is wider than the first color gamut. The apparatus also comprises a processing circuit operationally coupled to the memory unit. The processing circuit is configured to generate an enhancement layer comprising luma gain factor information and color vector information based on the base layer video content and the enhanced video content. The enhancement layer indicates a plurality of scaled levels of dynamic range and color gamut. The plurality of scaled levels of dynamic range from the first dynamic range to the second dynamic range and the plurality of scaled levels of color gamut range from the first color gamut to the second color gamut. The processing circuit is further configured to communicate the base layer video content and the enhancement layer to a display device.

A method for coding video content is provided. The method comprises obtaining base layer video content of a first dynamic range and a first color gamut. The method further comprises obtaining enhanced video content of a second dynamic range and a second color gamut. The second dynamic range is higher than the first dynamic range and the second color gamut is wider than the first color gamut. The method further comprises generating an enhancement layer comprising luma gain factor information and color vector information based on the base layer video content and the enhanced video content. The enhancement layer indicates a plurality of scaled levels of dynamic range and color gamut. The plurality of scaled levels of dynamic range from the first dynamic range to the second dynamic range and the plurality of scaled levels of color gamut range from the first color gamut to the second color gamut. The method further comprises communicating the base layer video content and the enhancement layer to a display device.

An apparatus for coding video content is provided. The apparatus comprises means for obtaining base layer video content of a first dynamic range and a first color gamut and obtaining enhanced video content of a second dynamic range and a second color gamut. The second dynamic range is higher than the first dynamic range and the second color gamut is wider than the first color gamut. The apparatus further comprises means for generating an enhancement layer comprising luma gain factor information and color vector information based on the base layer video content and the enhanced video content. The enhancement layer indicates a plurality of scaled levels of dynamic range and color gamut. The plurality of scaled levels of dynamic range from the first dynamic range to the second dynamic range and the plurality of scaled levels of color gamut range from the first color gamut to the second color gamut. The apparatus further comprises means for communicating the base layer video content and the enhancement layer to a display device.

An apparatus for decoding and rendering video content is provided. The apparatus comprises a memory unit configured to store base layer video content of a first dynamic range and a first color gamut and an enhancement layer comprising luma gain factor information and color vector information. The luma gain factor information indicates a plurality of scaled levels of dynamic range ranging from the first dynamic range to a second dynamic range and the color vector information indicates a plurality of scaled levels of color gamut ranging from the first color gamut to a second color gamut. The apparatus further comprises a processing circuit configured to derive scaled video content of a third dynamic range and a third color gamut based on the base layer video content, the luma gain factor information, and the color vector information. The third dynamic range is higher than the first dynamic range and lower than the second dynamic range. The third color gamut is wider than the first color gamut and narrower than the second color gamut. The apparatus is further configured to render the scaled video content.

BRIEF DESCRIPTION OF THE DRAWINGS

The various features illustrated in the drawings may not be drawn to scale. Accordingly, the dimensions of the various features may be arbitrarily expanded or reduced for clarity. Dotted lines and objects indicate optional features. Dashed lines and boxes indicate groupings of components or objects. In addition, some of the drawings may not depict all of the components of a given system, method, or device. Furthermore, like reference numerals and characters may be used to denote like components, objects, and features throughout the detailed description and the drawings.

DETAILED DESCRIPTION

Figure 1:
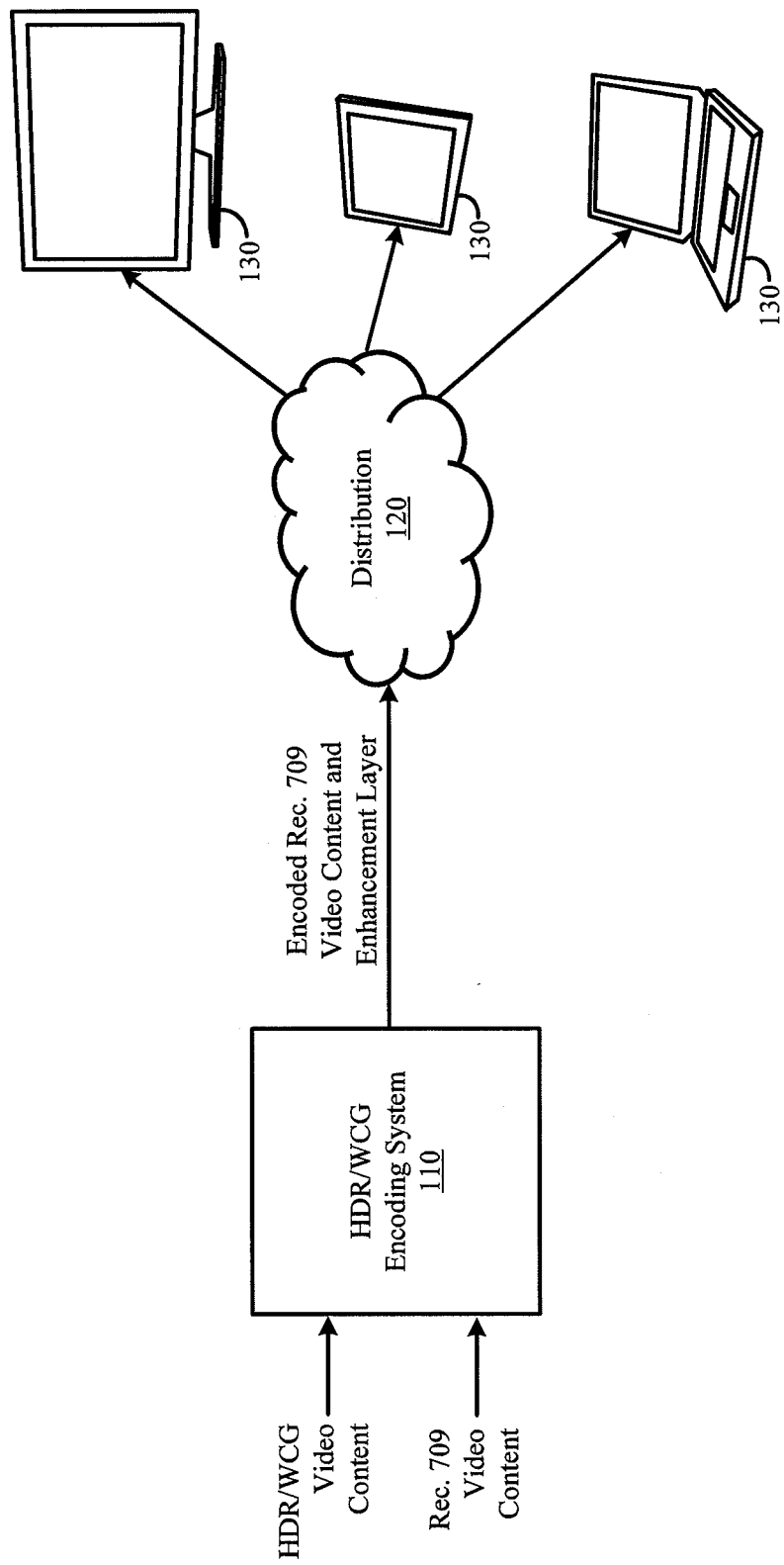
FIG. 1 shows a high-level overview of a high dynamic range/wide color gamut encoding system, a distribution system, and a display device, in accordance with exemplary embodiments of the invention.

Various aspects of the novel systems, apparatuses, and methods are described more fully hereinafter with reference to the accompanying drawings. The disclosure may, however, be embodied in many different forms and should not be construed as limited to any specific structure or function presented throughout this disclosure. Rather, these aspects are provided so that this disclosure will be thorough and complete, and will fully convey the scope of the disclosure. The scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different system configurations, video standards, coding standards, and color spaces, some of which are illustrated by way of example in the figures and in the following description of the preferred aspects. The detailed description and drawings are merely illustrative of the disclosure rather than limiting, the scope of the disclosure being defined by the appended claims and equivalents thereof.

As stated above, certain display devices are capable of reproducing an increased range of visible light. Visible light may generally be characterized by its luminance and its chromaticity. Luminance (Y) generally refers to a measure of the brightness of light as perceived by the human eye and may be measured in "nits." In video, dynamic range generally refers to the range of luminance that may be reproduced by a display device (e.g., the ratio between the maximum and minimum light intensities). Chromaticity generally refers to a description of a color of light and may be mapped as a coordinate on a color space, such as the International Commission on Illumination (CIE) 1931 RGB color space or the CIE 1931 XYZ color space. In video, color gamut generally refers to the subset of visible colors that may be reproduced by a display device. As such, display devices that are capable of a greater dynamic range and a wider color gamut may reproduce more visible colors.

As stated above, certain display devices are capable of producing video images with a dynamic range and a color gamut beyond the capabilities of current standards for television (e.g., Rec. 709) and cinema. For example, some display devices may be capable of producing light at more than 1,000 nits and may also be capable of reproducing more colors than the Rec. 709 colorimetry standard can account for. Such display devices may generally be referred to as high dynamic range ("HDR")/wide color gamut ("WCG") display devices.

FIG. 1 shows a high-level overview of a high dynamic range/wide color gamut ("HDR/WCG") encoding system 110, a distribution system 120, and a display device 130, in accordance with exemplary embodiments of the invention. As described in detail below, the HDR/WCG encoding system 110 may be configured to receive a source of Rec. 709 video content and a source of HDR/WCG video content. The HDR/WCG encoding system 110 may be further configured to transmit backwards compatible HDR/WCG video content comprising encoded base layer video content. The backwards compatible HDR/WCG video content is "backwards compatible" because it includes the base layer video content which is compatible with non-HDR/WCG display devices (e.g., Rec. 709 capable display devices). Base layer video content generally refers to video content that is compatible with current hardware and standards. For example, the base layer video content may be a source of Rec. 709 video content that may be configured according to the current Rec. 709 standard for high-definition television (HDTV).

The backward compatible HDR/WCG video content also includes an enhancement layer in addition to the base layer video content. As described in detail below, the display device 130 may be configured to adjust the luminance and chrominance of the base layer video content to reproduce the full HDR/WCG content using the enhancement layer. As such, the backwards compatible HDR/WCG video content has HDR and WCG characteristics. The enhancement layer may contain luminance and chrominance information that may be scaled by the display device 130 depending on its rendering capability. The rendering capability of a display generally refers to the set of all possible luminance and chrominance levels that can be produced by the display (i.e., all possible visible colors that a display can produce). The display device 130 may further adjust the enhancement layer based on the viewing environment and/or a preference of a viewer. Since the display device 130 may scale the enhancement layer, the backwards compatible HDR/WCG video content may be communicated to any display device 130, irrespective of the rendering capability of the display device 130.

The HDR/WCG encoding system 110 may provide the encoded Rec. 709 video content and the encoded enhancement layer to the display device 130 via the distribution system 120. Since the enhancement layer may be scaled by each display device 130 individually, a single distribution system 120 for video content may provide optimal visual quality regardless of the capabilities of the receiving display device 130.

As stated above, the HDR/WCG encoding system 110 may be configured to receive sources of Rec. 709 video content and HDR/WCG video content. In exemplary embodiments, the Rec. 709 video content and the HDR/WCG video content may be pixel aligned with each other such that objects in both the Rec. 709 video content and the HDR/WCG video content have the same pixel positions. Pixel aligned Rec.709 and HDR/WCG video content may be readily available for post-produced content, for example, feature films and episodic TV programs. A video camera (see FIG. 2) may be capable of generating the HDR/WCG video content, the Rec. 709 video content, or both. The HDR/WCG encoding system 110 may receive the HDR/WCG video content and the Rec. 709 video content from the video camera, or multiple video cameras, in a live stream or from a memory storage device (see FIG. 2).

In exemplary embodiments, the Rec. 709 video content and the HDR/WCG video content may have been creatively modified in a post-production process (not shown). In video, post-production generally refers to a process whereby an artist creatively modifies video content in order to present a desired visual effect. The post-production process may include, for example, video editing, image editing, color correction, and subsampling of the video content. The HDR/WCG encoding system 110 may be configured to generate backward compatible HDR/WCG video content that maintains an artistic intent created in the post-production process after being adjusted using the enhancement layer.

Figure 2:
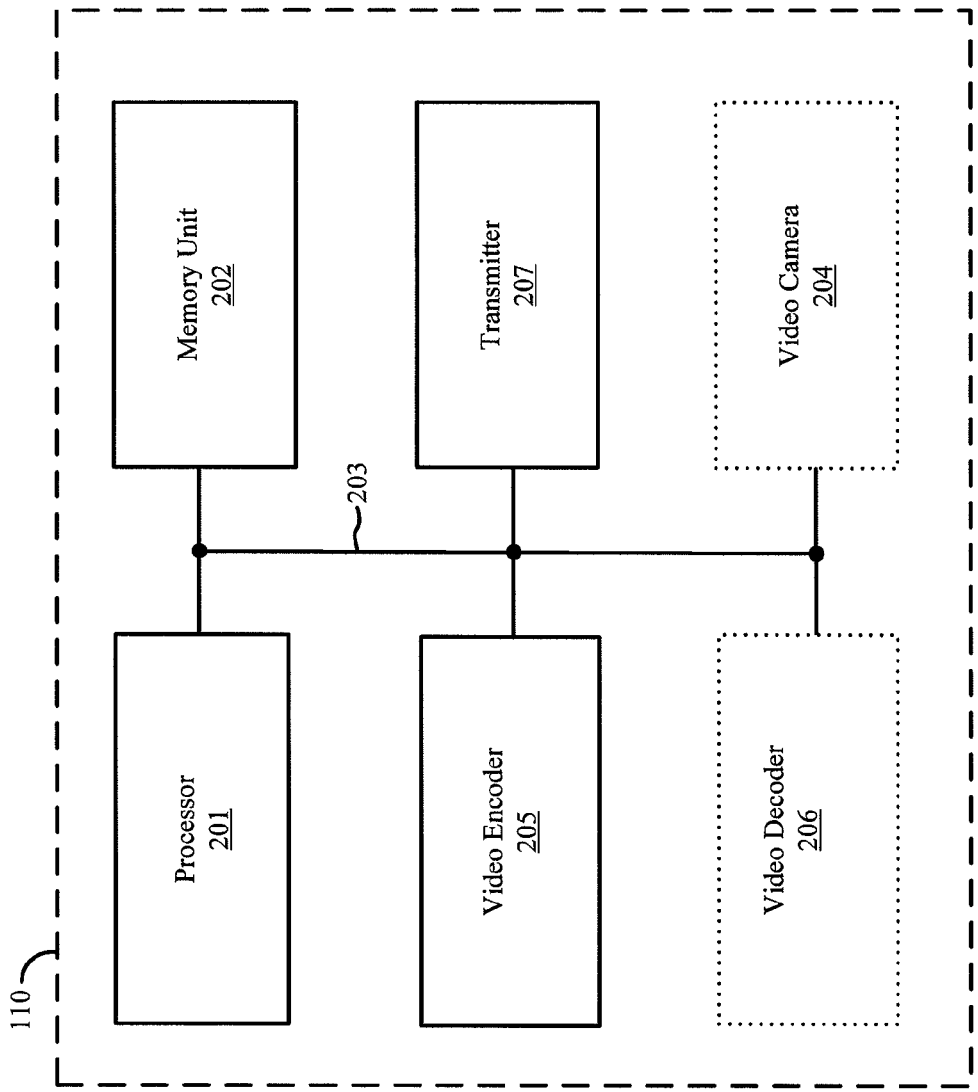
FIG. 2 is a functional block diagram of components that may be utilized in the high dynamic range/wide color gamut encoding system of FIG. 1, in accordance with exemplary embodiments of the invention.

FIG. 2 shows a functional block diagram of components that may be utilized in the HDR/WCG encoding system 110 of FIG. 1. The components described below may provide the HDR/WCG encoding system 110 with the capability to perform its functions as described below. The HDR/WCG encoding system 110 may comprise a processor 201 that is configured to control operations of the HDR/WCG encoding system 110. For example, the processor 201 may be configured to determine luma gain factor/color vector information from the source or decoded Rec.709 video content based on the HDR/WCG video content as described herein. The processor 201 may also be configured to multiplex (e.g., combine) the encoded Rec. 709 video content and the encoded enhancement layer into a single bitstream for transmission via the distribution system 120 as further described below.

The processor 201 may be implemented with any combination of processing circuits, general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processor 201 may be configured to execute instruction codes (e.g., in source code format, binary code format, executable code format, or any other suitable format of code). The instructions, when executed by the processor 201, may perform HDR/WCG encoding as described herein.

The HDR/WCG encoding system 110 may also comprise a memory unit 202. The memory unit 202 may be configured to store the Rec. 709 video content, the HDR/WCG video content, the luma gain factor/color vector information, and any other information or data described herein. The memory unit 202 may comprise both read-only memory (ROM) and random access memory (RAM) and may provide instructions and data to the processor 201. A portion of the memory unit 202 may also include non-volatile random access memory (NVRAM). The processor 201 may be configured to perform logical and arithmetic operations based on instructions stored within the memory unit 202.

The memory unit 202 may be coupled to the processor 201 via a bus system 203. The bus system 203 may be configured to couple each component of the HDR/WCG encoding system 110 to each other component in order to provide information transfer.

The HDR/WCG encoding system 110 may also comprise a video encoder 205 coupled to the bus system 203. The video encoder 205 may be configured according to at least one encoding standard (e.g., AVC/H.264, HEVC/H.265, VP9, etc.). The video encoder 205 may comprise a plurality of encoding circuits. The video encoder 205 may be configured to encode both the Rec. 709 video content and enhancement layer comprising the luma gain factor/color vector information.

In some embodiment, the HDR/WCG encoding system 110 may optionally comprise a video decoder 206 coupled to the bus system 203. The video decoder 206 may be configured according to at least one decoding standard (e.g., AVC/H.264, HEVC/H.265, VP9, etc.). The video decoder 206 may be configured to decode the encoded Rec. 709 video content as further described below with reference to FIG. 3A.

The HDR/WCG encoding system 110 may also comprise a transmitter 207 coupled to the bus system 203. The transmitter 207 may be configured to allow for transmission of data from the HDR/WCG encoding system 110 to the display device 130 via the distribution system 120. For example, the transmitter 207 may be configured to transmit the bitstream comprising the encoded Rec. 709 video content and the encoded enhancement layer as described herein. The transmitter 207 may also be configured to transmit metadata to the display device 130 as described in further detail below.

In some embodiments, the HDR/WCG encoding system 110 may optionally comprise a video camera 204 coupled to the bus system 203. The video camera 204 may include a plurality of cameras for recording video content. For example, the video camera 204 may be configured to capture the Rec. 709 video content and/or the HDR/WCG video content.

Although a number of separate components are shown in FIG. 2, one or more of the components may be combined or commonly implemented. Further, each of the components shown in FIG. 2 may be implemented using a plurality of separate elements.

Figure 3A:
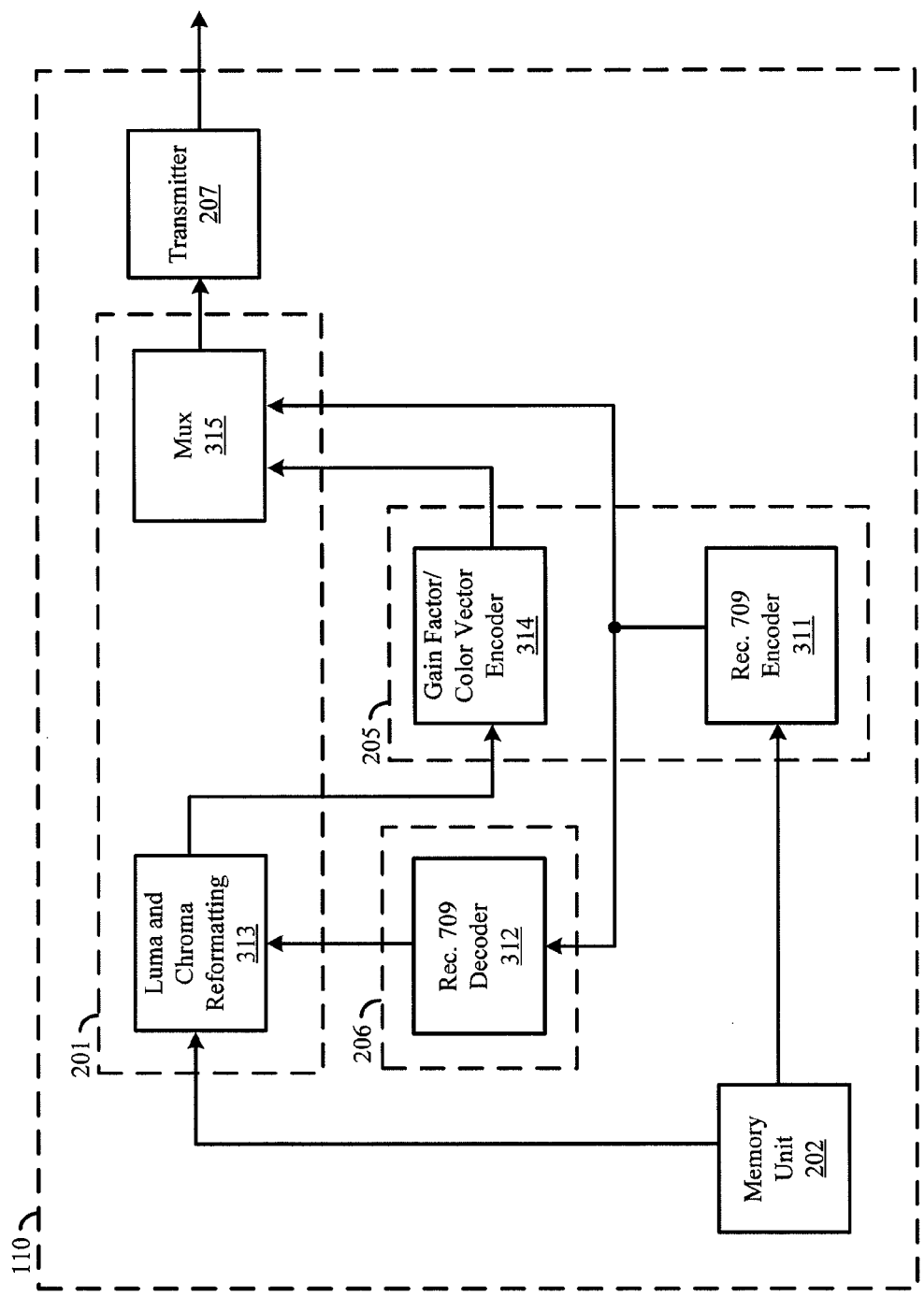
FIG. 3A is a functional block diagram of a closed loop embodiment of the high dynamic range/wide color gamut encoding system components of FIG. 2, in accordance with exemplary embodiments of the invention.

FIG. 3A is a functional block diagram of a closed loop embodiment of the HDR/WCG encoding system 110 components of FIG. 2 in a closed loop embodiment, in accordance with exemplary embodiments of the invention. The closed loop embodiment of the HDR/WCG encoding system 110 comprises the processor 201, the memory unit 202, the video decoder 206, the video encoder 205, and the transmitter 207.

The memory unit 202 may be configured to receive and store the source Rec. 709 video content and the source HDR/WCF video content as described above. The video encoder 205 may comprise a Rec. 709 encoder 311. The Rec. 709 encoder 311 may be configured to receive the Rec. 709 video content from the memory unit 202 and encode the Rec. 709 video content. The Rec.709 encoder 311 may be configured according to the Advanced Video Coding (AVC)/H.264 encoding standard, the High Efficiency Video Coding (HEVC)/H.265 encoding standard, the VP9 encoding standard, or another coding standard. The Rec. 709 encoder 311 may perform a quantizing process to reduce the number of colors represented in the encoded Rec. 709 video content. The encoded Rec. 709 video content generated by the Rec.709 encoder 311 may serve as base layer video content for non-HDR/WCG capable display devices. Furthermore, the encoded Rec. 709 video content may be used for real-time coding applications to reduce latency.

The video decoder 206 may comprise a Rec.709 decoder 312. The Rec. 709 decoder 312 may be configured receive and decode the encoded Rec. 709 video content from the Rec. 709 encoder 311. The Rec. 709 decoder 312 may be configured according to the AVC/H.264 encoding standard, the HEVC/H.265 encoding standard, the VP9 encoding standard, or another coding standard used by the video encoder 205. In other embodiments, the HDR/WCG encoding system 110 may perform operations directly on the source Rec. 709 video content as described in further detail below with reference to FIG. 3B.

The processor 201 may comprise a luma and chroma reformatting component 313. The luma and chroma reformatting component may be implemented as a functional unit operating on the processor 201 or it may be implemented as a discrete hardware circuit. The luma and chroma reformatting component 313 may be configured to receive the HDR/WCG video content from the memory unit 202 and the decoded Rec. 709 video content from the Rec. 709 decoder 312. The luma and chroma reformatting component 313 may be configured to process both the HDR/WCG video content and the decoded Rec. 709 video content together to generate an enhancement layer comprising luma gain factor information and color vector information. Since the luma and chroma reformatting component 313 processes the decoded Rec. 709 video content, the luma gain factor information and the color vector information may account for distortions, such as quantization and clipping, which may occur during the encoding process performed by the Rec. 709 encoder 311.

In video, luma (Y') represents the brightness of an image. The luma gain factor information generated by the luma and chroma reformatting component 313 may indicate a factor by which a luma value of the decoded Rec. 709 video content may be adjusted in order to match a luma value of the HDR/WCG video content. In some embodiments, the luma gain factor information may be configured to use a maximum value of 100. For example, the maximum luma gain factor value may be set to 100 when a white level of 100 nits is used for the decoded Rec. 709 video content and a white level of 10,000 nits is used for the HDR/WCG video content. A minimum value of the luma gain factor information may be a fractional value of less than 1. A fractional luma gain factor value may indicate that details (e.g., accuracy in the levels of luma) of the Rec. 709 video content may have been lost. For example, details may be lost when a bright window is depicted in the video content because the Rec. 709 standard may not be capable of representing such a high level of luminance. The luma gain factor information may also code low level details as fractional values. Low level details may include subtle textures, objects in shadows, clouds, or the filament of a light bulb.

In video, chroma (represented as UV, $C_bC_r$, X'Z', $D'_XD'_Z$, etc.) represents a color of an image. The color vector information generated by the luma and chroma reformatting component 313 may indicate a color vector along which a chroma value of the decoded Rec. 709 video content may be projected in order to match a chroma value of the HDR/WCG video content. For example, the color vector information may comprise a 2-dimensional color vector that represents the location of a WCG color in an XYZ color space with respect to a gamut mapped color of the base layer Rec. 709 video content. The color vector may be configured to represent any color within the Rec. 709 range and visible colors outside of the Rec. 709 range. As such, a display device 130 receiving the backward compatible HDR/WCG video content may be configured to recover a chroma value of the HDR/WCG video content by adjusting a chroma value of the decoded Rec. 709 video content based on the decoded color vector information.

In some embodiments, a chroma sub-sampling structure of the color vector information may correspond to a chroma sub-sampling structure of the coded Rec. 709 color. For example, the Rec. 709 video content and the color vector information may both be 4:2:0 subsampled. Subsampling is a process used to reduce the number of color samples of an image to improve coding efficiency while still retaining image quality. Subsampling maintains image quality because the human eye is less sensitive to color resolution than it is to luminance resolution. The luma and chroma reformatting component 313 may also define a limited quantization range of the color vectors within a given region of an image such as a macro-block. As video encoders are limited to a set number of bits per axis, the limited quantization range may allow for more precision in the colors within that range. For example, finer quantization steps may be used to define colors outside the Rec. 709 gamut and coarser quantization steps may be used to define colors within the Rec. 709 gamut, such as when color information is lost in the encoded Rec. 709 video content (e.g., when a view from a bright window is clipped). Where color information has been lost in the encoded Rec. 709 video content but is available in the HDR/WCG video content, the luma and chroma reformatting component 313 may define a reference color point, such as a white point of the Rec. 709 video content, and a color vector corresponding to the lost information may indicate a vector from the reference color point to a color within the Rec. 709 color space.

As described in connection with FIG. 1, HDR/WCG encoding system 110 may provide the base layer video content (e.g., Rec. 709 video content) and the enhancement layer. The base layer video content and the enhancement layer provide backwards compatible video content that may be distributed to display devices 130 irrespective of the rendering capability of each respective display device 130. For example, the HDR/WCG encoding system 110 may distribute the backwards compatible video content to a display device 130 that is not capable of producing and displaying (i.e., rendering) the full range brightness levels and colors contained in the HDR/WCG video content.

As further described below in connection with FIG. 4, the luma gain factors and color vectors of the enhancement layer provide an indication of linear, per-pixel operations for regenerating the HDR/WCG video content from the base layer video content. Since the gain factors and color vectors are linear operations, the display device 130 may scale these values proportionally, based on the rendering capability of the display device 130 (e.g., the limits of dynamic range and color gamut that the display device 130 is capable of producing). As such, the enhancement layer may be used by display devices 130 having different rendering capabilities. The rendering process is further described below with reference to FIG. 8. Because the enhancement layer is transmitted irrespective of the rendering capabilities of the display devices 130, the single distribution system 120 may provide the backwards compatible video content. This is beneficial because the HDR/WCG encoding system 110 may use less computing and distribution resources compared to different systems that require the generation of multiple copies of the video content suitable for each variation of display device 130.

The video encoder may comprise a gain factor/color vector encoder 314. The gain factor/color vector encoder 314 may receive the luma gain factor information and the color vector information from the luma and chroma reformatting component 313. The gain factor/color vector encoder 314 may be configured according to the AVC/H.264 encoding standard, the HEVC/H.265 encoding standard, or another coding standard. The gain factor/color vector encoder 314 may be configured to encode the luma gain factor and color vector information using the same coding process as the Rec. 709 encoder 311. The luma gain factor information may be coded as luma and the color vector information may be coded as chroma in order to be encoded by an encoding standard (e.g., AVC/H.264 or HEVC/H.265). In one embodiment, the Rec. 709 encoder 311 and the gain factor/color vector encoder 314 may both be configured to encode using the HEVC main profile (4:2:0, 10-bit). In another embodiment, the Rec. 709 encoder 311 and the gain factor/color vector encoder 314 may be configured to encode using the AVC high profile (4:2:0, 8-bit). As described above, the encoded luma gain factor and color vector information may generally be referred to as an enhancement layer with respect to the base layer video content.

The gain factor/color vector encoder 314 may be further configured to use information from the process of encoding the Rec. 709 video content in the process of encoding the luma gain factor and color vector information. This may be beneficial, for example, where areas of an image correspond to high gain factors that may benefit from more precision in quantization in the corresponding area of the decoded Rec. 709 video content, thereby minimizing artifacts, such as contouring or banding. Furthermore, the gain factor/color vector encoder 314 may be configured to spatially filter the luma gain factors within images or temporally filter the luma gain factors between images to improve coding efficiency and minimize contouring and flickering artifacts.

In some embodiments, the gain factor/color vector encoder 314 may be configured to compute an average luma gain factor at a macro-block level to reduce a range of the luma gain factors in a given block. This configuration may increase the coding efficiency of the gain factor information. The gain factor/color vector encoder 314 may also be configured to define a quantization range of color vectors at the macro-block level. The gain factor/color vector encoder 314 may be configured to use finer quantization steps to define colors outside of the Rec. 709 color gamut and to use coarser quantization steps to define colors within the Rec. 709 color gamut, such as when color information is lost in the Rec. 709 base layer.

As stated above, the Rec. 709 encoder 311 and the gain factor/color vector encoder 314 may be configured according to a coding standard (e.g., HEVC or AVC). In some embodiments the Rec. 709 encoder 311 and the gain factor/color vector encoder 314 may be configured to perform joint rate control. Joint rate control may allow for each of the gain factor/color vector encoder 314 and the Rec. 709 encoder 311 to use information from the other encoder in performing quantization to improve image quality for a given bit rate. Embodiments using joint rate control are beneficial because they may reduce banding and contouring artifacts in the backward compatible HDR/WCG video content.

The processor 201 may comprise a multiplexer ("mux") 315 configured to receive and multiplex (e.g., combine) the encoded Rec. 709 video content from the Rec. 709 encoder 311 and the encoded luma gain factor and color vector information from the gain factor/color vector encoder 314. The multiplexer 315 may be configured to generate a bitstream comprising the backward compatible HDR/WCG video content by packaging the encoded Rec. 709 video content and the encoded luma gain factor/color vector information together. As described above, the transmitter 207 may be configured to transmit the bitstream generated by the multiplexor 315. As described above, the Rec. 709 video content may be referred to as a base layer and the luma gain factor/color vector information may be referred to as an enhancement layer.

In some embodiments, the processor 201 may be configured to generate metadata (not shown) indicating a dynamic range and a color gamut of a reference display used in the content creation process for the Rec. 709 video content and the HDR/WCG video content. The backward compatible HDR/WCG video content may further comprise the metadata or the transmitter 207 may transmit the metadata separately. As described above, the backward compatible HDR/WCG video content may be provided to the distribution system 120, which may be part of a distribution package targeted to display devices 130, such as smart TVs, personal computers (PCs), and tablets. As described in further detail below, the display devices 130 may comprise video decoders and may be configured to receive, decode, and render the backward compatible HDR/WCG video content received via the distribution system 120 according to a dynamic range and color gamut capability of the display device. The display devices 130 may be further configured to decode and render the backward compatible HDR/WCG video content according to a viewing environment of the display device 130.

In one embodiment, the backward compatible HDR/WCG video content may be provided to display devices 130 of varying capabilities, such as a smart TV, a laptop, and a tablet. In this embodiment, the smart TV may be capable of displaying the full HDR/WCG video content, the laptop may be capable of displaying some range of the HDR/WCG video content, and the tablet be capable of displaying the base layer Rec. 709 video content. In this embodiment, the display devices 130 may be configured to decode the backward compatible HDR/WCG video content and adjust the decoded Rec. 709 video based on the luma gain factor and color vector information, according to its capabilities. For example, the smart TV may display the full HDR/WCG content, the laptop may display scaled-down HDR/WCG video content, and the tablet may display Rec. 709 video content. The backward compatible HDR/WCG video content provided by the HDR/WCG encoding system 110 is beneficial because it provides optimal visual quality for each display device 130.

The HDR/WCG encoding system 110 is also beneficial because it does not restrict the content creation process. This is because the Rec. 709 video content and the HDR/WCG video content are received post-production. As such, an artistic intent of the content creator is maintained for both the base layer and the scaled or full HDR/WCG video content. Also, the HDR/WCG encoding system 110 may offer graceful degradation by maintaining image quality when a bit rate for encoding is decreased. Furthermore, as described above, the HDR/WCG encoding system 110 may not require new coding tools because conventional HEVC/AVC, or other, coders may be used.

Figure 3B:
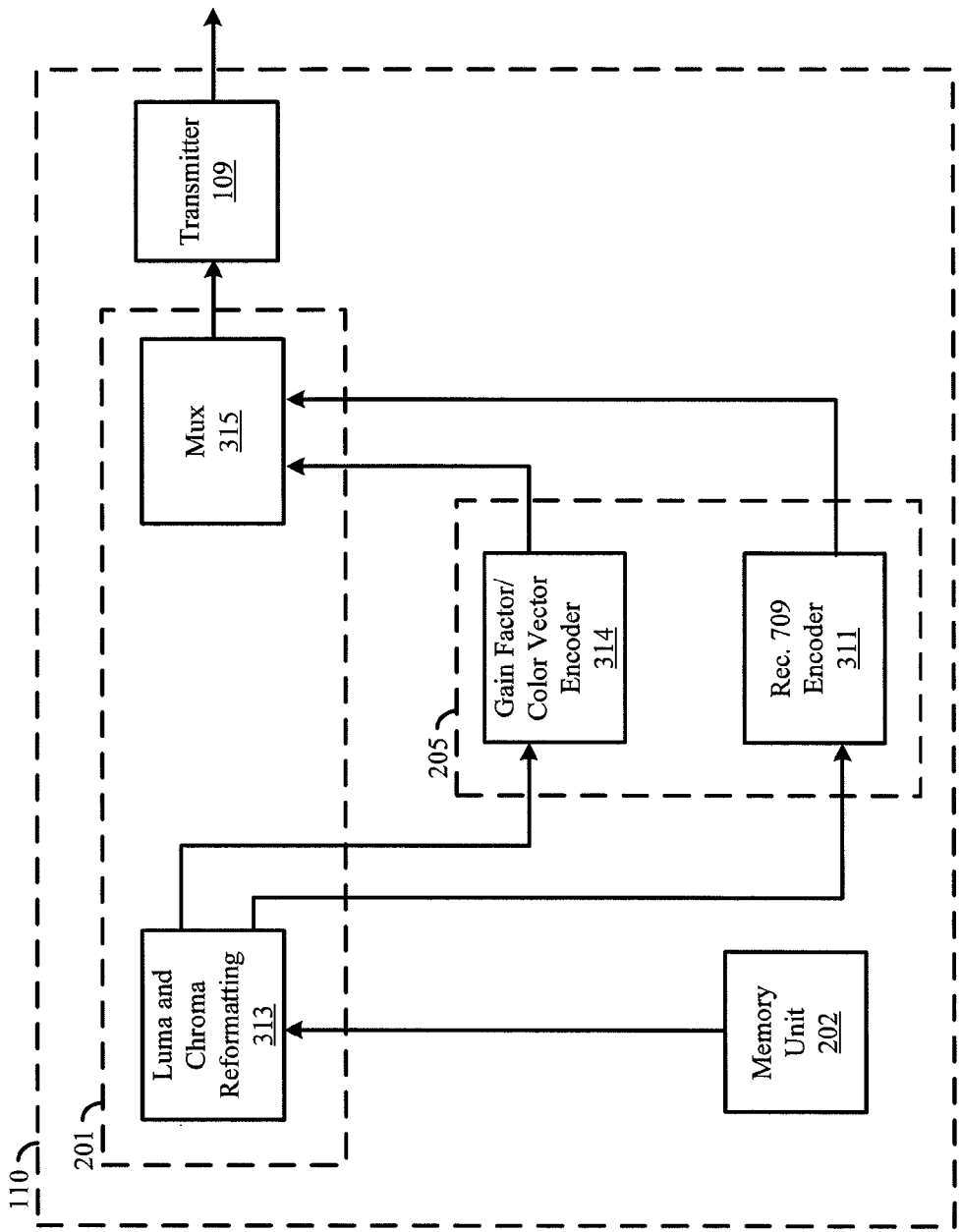
FIG. 3B is a functional block diagram of an open loop embodiment of the high dynamic range/wide color gamut encoding system components of FIG. 2, in accordance with exemplary embodiments of the invention.

FIG. 3B is a functional block diagram of an open loop embodiment of the HDR/WCG encoding system components of FIG. 2, in accordance with exemplary embodiments of the invention. The open loop embodiment of FIG. 3B is configured similarly to the closed loop embodiment of FIG. 3A except that it does not comprise the video decoder 206 comprising the Rec. 709 video decoder 312. Accordingly, the luma and chroma reformatting component 313 of the open loop embodiment of FIG. 3B receives the source Rec. 709 video content instead of the decoded Rec. 709 video content used in the closed loop embodiment of FIG. 3A.

As described above, the memory unit 202 may be configured to receive and store the source of Rec. 709 video content and the source of HDR/WCG video content. In the embodiment of FIG. 3B, the luma and chroma reformatting component 313 may be configured to receive the source Rec. 709 video content and the source HDR/WCG video content from the memory unit 202. The luma and chroma reformatting component 313 may be configured similarly to the luma and chroma reformatting component 313 described above with reference to FIG. 3A. However, as mentioned above, the luma and chroma reformatting component 313 in FIG. 3B may be configured to receive the source Rec. 709 video content while the luma and chroma reformatting component 313 of FIG. 3A may be configured to receive the decoded Rec. 709 video content. The luma and chroma reformatting component 313 may be configured to generate luma gain factor information and color vector information based on the source Rec. 709 video content and the source HDR/WCG video content. As such, the open loop embodiment of HDR/WCG encoding system 110 may be retrofit to existing Rec. 709 decoding systems.

The open loop embodiment may comprise the video encoder 205. The video encoder 205 may comprise the Rec. 709 encoder 311 and the gain factor/color vector encoder 314 described above. In the open loop embodiment, the Rec. 709 encoder 311 may be configured to receive the reformatted Rec. 709 video content directly or indirectly from the luma and chroma reformatting component 313. The Rec. 709 encoder 311 may be configured to encode the Rec. 709 video content according to the AVC/H.264 encoding standard, the HEVC)/H.265 encoding standard, or another coding standard.

The open loop embodiment of the HDR/WCG encoding system 110 may also comprise the gain factor/color vector encoder 314. The gain factor/color vector encoder 314 may be configured to receive the luma gain factor information and the color vector information from the luma and chroma reformatting component 313. The gain factor/color vector encoder 314 may be configured similar to the gain factor/color vector encoder 314 as described above with reference to FIG. 3A. The gain factor/color vector encoder 314 may be configured to encode the luma gain factor information and the color vector information as an enhancement layer as described above. The gain/vector encoder 314 may be configured according to the AVC/H.264 encoding standard, the HEVC/H.265 encoding standard, or another coding standard. The gain/vector encoder 314 may be configured to encode the luma gain factor and color vector information using the same coding process as the Rec. 709 encoder 311. For example, the Rec. 709 encoder 311 and the gain/vector encoder 314 may both be configured to code using the HEVC main profile (4:2:0, 10-bit) or, in another example, the AVC high profile (4:2:0, 8-bit).

The open loop embodiment of the HDR/WCG encoding system 310 may also comprise the multiplexer 315. The multiplexer may be configured to receive the encoded luma gain factor information and encoded color vector information from the gain factor/color vector encoder 315. The multiplexer 315 may also be configured to receive the encoded Rec. 709 video content from the Rec. 709 encoder 311. The multiplexer 315 may be configured similar to the multiplexer 315 described above with reference to FIG. 3A. The multiplexer 315 may be further configured to package the encoded Rec. 709 video content and the encoded luma gain factor/color vector information (e.g., the enhancement layer) into a single bitstream for transmission by the transmitter 109 as described above.

It may be advantageous to use the open loop embodiment of the HDR/WCG encoding system 310 for real-time applications because it may have lower complexity and latency compared to the closed loop embodiment of FIG. 3A. Because the Rec. 709 video content has not been encoded as in the closed loop embodiment, the luma and chroma reformatting component 313 in the open loop embodiment may not have information about the encoded Rec. 709 content. As such, an error rate of the decoded content from the open loop embodiment of FIG. 3B may be greater than an error rate of decoded content from the closed loop embodiment of FIG. 3A.

Figure 4:
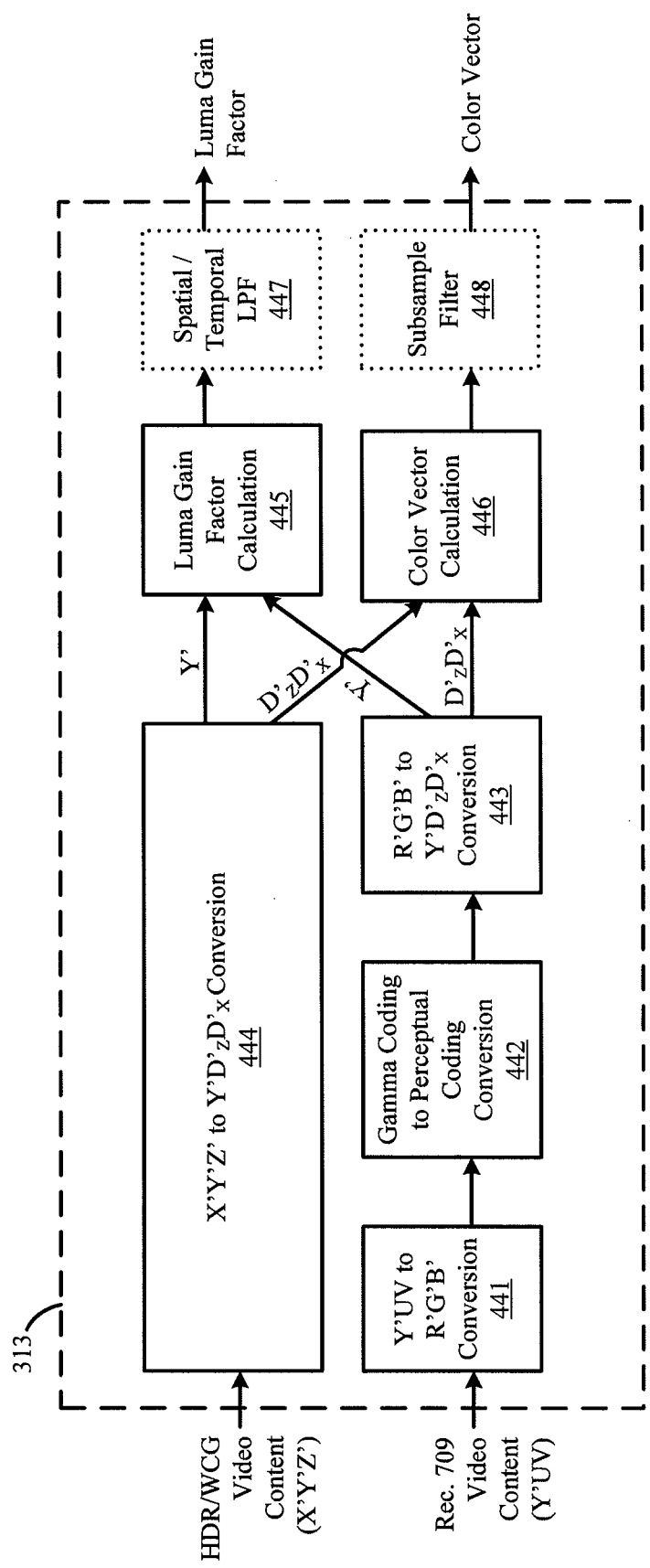
FIG. 4 is a functional block diagram of the luma and chroma reformatting component of FIG. 3A and FIG. 3B, in accordance with exemplary embodiments of the invention.

FIG. 4 is a functional block diagram of the luma and chroma reformatting component 313 of FIG. 3A and FIG. 3B, in accordance with exemplary embodiments of the invention. The luma and chroma reformatting component 313 may be used in the closed loop embodiment of the HDR/WCG encoding system 110 in FIG. 3A or the open loop embodiment of the HDR/WCG encoding system 110 in FIG. 3B. As described above, the luma and chroma reformatting component 313 may receive either source Rec. 709 video content or decoded Rec. 709 video content. The luma and chroma reformatting component 313 may also receive HDR/WCG video content. The Rec. 709 video content may comprise luma (Y') and chroma (UV) components. The HDR/WCG video content may comprise luma (Y') and chroma (X'Z') components. In video, the prime symbol (') generally denotes gamma or perceptual coding. The luma and chroma reformatting component 313 may be configured to convert the luma and chroma components of the Rec. 709 video content and the luma and chroma components of the HDR/WCG video content to a common color space (i.e., to a common luma and chroma representation) for processing with the HDR/WCG source. The Rec. 709 video content and the HDR/WCG video content are converted into a common color space so that the luma and chroma components of each may be directly compared. In some embodiments, the common color space may be the $Y'D'_Z D'_X$ color space, which is a proposed society of motion picture and television engineers (SMPTE) standard. The common color space may capable of representing the HDR/WCG color space and Rec. 709 color space. The common color space may be any color space that separates luminance and chrominance information. Converting to a common color space that limits contamination of luminance in the chrominance information (e.g., $Y'D'_Z D'_X$) is beneficial because it may improve coding efficiency since changes in the luminance components will not cause a change in the chrominance components.

The luma and chroma reformatting component 313 may comprise a Y'UV to R'G'B' conversion component 441. The Y'UV to R'G'B' conversion component 441 may be configured to receive the Rec. 709 video content and convert it to the R'G'B' color space.

The luma and chroma reformatting component 313 may further comprise a gamma coding to perceptual coding conversion component 442 configured to receive the converted Rec. 709 video content from the Y'UV to R'G'B' conversion component 441. The gamma coding to perceptual coding conversion component 442 may be configured to further convert the gamma coding of the Rec. 709 video content to perceptual coding. Gamma coding generally refers to a particular non-linear coding method. Perceptual coding generally refers to non-linear coding methods that use coarser quantization steps for color differences that are less noticeable and finer quantization steps for color differences that are more noticeable.

The luma and chroma reformatting component 313 may also comprise an R'G'B' to $Y'D'_ZD'_X$ conversion component 443 that may be configured to receive the converted Rec.709 video content from the gamma coding to perceptual coding conversion component 442. The R'G'B' to $Y'D'_ZD'_X$ conversion component 443 may be configured to further convert the Rec. 709 video content to an $Y'D'_ZD'_X$ color space. The $Y'D'_ZD'_X$ color space may also be perceptually coded.

The luma and chroma reformatting component 313 may also comprise an X'Y'Z' to $Y'D'_ZD'_X$ conversion component 444 configured to receive the HDR/WCG video content. The X'Y'Z' to $Y'D'_ZD'_X$ conversion component 444 may be configured to convert the HDR/WCG video content to the $Y'D'_ZD'_X$ color space by performing a color difference process on the HDR/WCG video content.

The luma and chroma reformatting component 313 may also comprise a luma gain factor calculation component 445 configured to receive the luma (Y') components of both the converted HDR/WCG video content and the converted Rec. 709 video content, from the X'Y'Z' to $Y'D'_ZD'_X$ conversion component 444 and the R'G'B' to $Y'D'_ZD'_X$ conversion component 443 respectively. The luma gain factor calculation component 445 may be configured to calculate luma gain factor information by performing a division process on the Y' components from the converted Rec. 709 video content and the converted HDR/WCG video content. The luma gain factor calculation component 445 may be further configured to convert the luma gain factor information into log values which may provide a better distribution of range values for encoding since the human eye perceives brightness logarithmically.

For example, the luma gain factor calculation component 445 may determine that a first pixel of the HDR/WCG content has a luma value of 10,000 nits and that the corresponding first pixel of the Rec. 709 video content has a luma value of 100 nits. The luma gain factor calculation component 445 may divide the HDR/WCG luma value (10,000 nits) by the Rec. 709 luma value (100 nits) and calculate that the gain factor for the first pixel is 100. The luma gain factor calculation component 445 may calculate luma gain factors for each pixel of the video content. As such, the luma gain factor calculation component 445 may provide luma gain factors that indicate the luma of the HDR/WCG video content based on the luma of the Rec. 709 video content. Furthermore, the luma gain factors are scalable since the transformation above is linear.

In some embodiments, the luma and chroma reformatting component 313 may optionally comprise a spatial/temporal low pass filter (LPF) 447. The spatial/temporal LPF 446 may be configured to receive the luma gain factor information from the luma gain factor calculation component 445. The spatial/temporal LPF 447 may be configured to filter the luma gain factor information, which may minimize decoding artifacts such as banding and flickering. The luma and chroma reformatting component 313 may provide the filtered luma gain factors to the gain factor/color vector encoder 314 as described above. In some embodiments, the luma gain factor information may indicate gain factors for each pixel of the Rec. 709 video content.

The luma and chroma reformatting component 313 may also comprise a color vector calculation component 446 configured to receive the chroma components ($D'_Z D'_X$) of both the converted HDR/WCG video content and the converted Rec. 709 video content, from the X'Y'Z' to $Y'D'_ZD'_X$ conversion component 444 and the R'B'G' to $Y'D'_ZD'_X$ conversion component 443 respectively. The color vector calculation component 446 may be configured to calculate color vector information based on performing a subtraction process on the $D'_Z D'_X$ components of the converted HDR/WCG video content and the converted Rec. 709 video content. In some embodiments, the color vector information may indicate color vectors relating to the corresponding chroma components for each pixel of the Rec. 709 video content.

For example, the color vector calculation component 446 may determine the chroma coordinates ($D'_Z D'_X$) for a first pixel of the HDR/WCG video content and the chroma coordinates ($D'_Z D'_X$) for the corresponding first pixel of the Rec. 709 video content. The color vector calculation component 446 may subtract the Rec. 709 $D'_Z$ component from the HDR/WCG $D'_Z$ component and subtract the Rec. 709 $D'_X$ component from the HDR/WCG $D'_X$ component. The result of this calculation is a color vector for the first pixel that points to the HDR/WCG chroma coordinate from the Rec. 709 chroma coordinate. The color vector factor calculation component 446 may calculate color vectors for each pixel of the video content. As such, the color vector calculation component 446 may provide color vectors that indicate the chroma of the HDR/WCG video content based on the chroma of the Rec. 709 video content. Furthermore, the color vectors are scalable since the transformation above is linear.

The luma and chroma reformatting component 313 may also comprise a subsample filter 448 configured to receive the color vector information from the color vector calculation component 446. The subsample filter 448 may be configured to subsample the color vector information to create a 4:2:0 or 4:2:2 sampling structure. In some embodiments, a subsampling filter of the Rec. 709 video content may match a subsampling filter of the luma gain factor/color vector information.

As described above, the luma and chroma reformatting component 313 provides an enhancement layer comprising scalable luma gain factors and scalable color vectors. The scalable luma gain factors may be scaled from the dynamic range of the Rec. 709 base layer video content up to the dynamic range of the HDR/WCG video content, or any partial dynamic range in between. Similarly, the scalable color vectors may be scaled from the color gamut of the Rec. 709 base layer video content up to the color gamut of the HDR/WCG video content, or any partial color gamut in between. Therefore, the enhancement layer provides data indicating of all partial dynamic ranges and color gamuts from the Rec. 709 video content up to the full HDR/WCG video content. As such, a display device 130 may use the enhancement layer to adjust the dynamic range and color gamut of the Rec. 709 base layer video content to meet its own rendering requirements and specification. For example, the display device 130 may adjust the dynamic range and color gamut of the Rec. 709 base layer video content up to the full HDR/WCG dynamic range and color gamut or any partial dynamic range and color gamut in between. Accordingly, the display device 130 may scale the enhancement layer in proportion to its dynamic range and color gamut capability such that the rendered video content provides the fullest range of brightness and color that the display device 130 is capable of supporting. Since each display device 130 may scale the enhancement layer in proportion to its rendering capability, the enhancement layer may be transmitted to any display device 130, irrespective of its rendering capabilities. For example, a display device 130 that is Rec. 709 capable may render the Rec. 709 base layer video content alone while a display device 130 that is fully HDR/WCG capable may use the enhancement layer to reproduce the full HDR/WCG video content. Furthermore, a display device 130 that is partially HDR/WCG capable may proportionally scale the enhancement layer to fit its dynamic range and color gamut capability.

Figure 5:
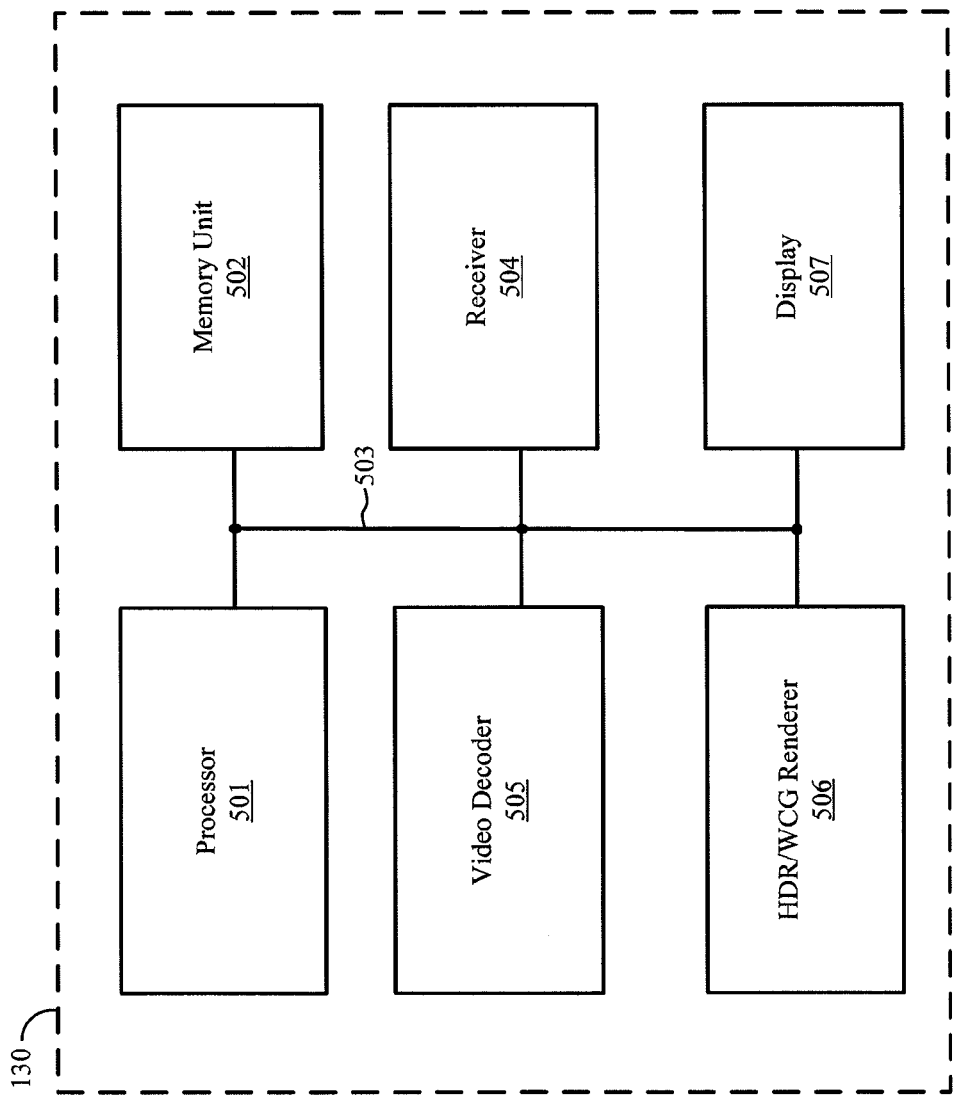
FIG. 5 is a functional block diagram of components that may be utilized in the display device of FIG. 1, in accordance with exemplary embodiments of the invention.

FIG. 5 is a functional block diagram of components that may be utilized in the display device 130 of FIG. 1, in accordance with exemplary embodiments of the invention. The components described below may provide the display device 130 with the capability to decode, adjust, and render the received Rec. 709 video content based on the received luma gain factor/color vector information as further described below.

The display device 130 may comprise a processor 501 that is configured to control operations of the display device 130. The processor 501 may be configured to reformat and convert the color space of the Rec. 709 content to another color space. The processor 501 may also be configured to scale the luma gain factor information and the color vector information based on the range limit information and viewing condition information or viewer preference information as described herein. The processor 501 may also be configured to de-multiplex the bitstream comprising the Rec. 709 video content and the luma gain factor/color vector information.

The processor 501 may be implemented with any combination of processing circuits, general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processor 501 may be configured to execute instruction codes (e.g., in source code format, binary code format, executable code format, or any other suitable format of code). The instructions, when executed by the processor 501, may perform HDR/WCG decoding, adjusting, scaling, and rendering as described herein.

The display device 130 may also comprise a memory unit 502. The memory unit 502 may be configured to store the Rec. 709 video content, the luma gain factor/color vector information, and any other information or data described herein. The memory unit 502 may comprise both read-only memory (ROM) and random access memory (RAM) and may provide instructions and data to the processor 501. A portion of the memory unit 602 may also include non-volatile random access memory (NVRAM). The processor 501 may be configured to perform logical and arithmetic operations based on instructions stored within the memory unit 202.

The display device 130 may also comprise a bus system 603. The bus system 603 may be configured to couple the memory unit 502 to the processor 501. In addition, the bus system 503 may be configured to couple each component of the display device 139 to each other component in order to provide information transfer.

The display device 130 may also comprise a video decoder 505 coupled to the bus system 503. The video decoder 505 may be configured according to at least one decoding standard (e.g., AVC/H.264, HEVC/H.265, VP9, etc.). The video decoder 505 may comprise a plurality of decoding circuits. The video decoder 505 may be configured to decode the encoded Rec. 709 video content and decode the encoded luma gain factor/color vector information.

The display device 130 may also comprise an HDR/WCG renderer 506 coupled to the bus system 603. The HDR/WCG renderer 506 may be configured to adjust the Rec. 709 video content based on the luma gain factor/color vector information as described herein. The HDR/WCG renderer 506 may be configured to render the scaled video content for reproducing on a display 507.

The display 507 may be coupled to the bus system 503. In some embodiment, the display 507 may be separate and discrete from the video renderer 506. The display 507 may be configured to display the scaled video content received from the video renderer 506. The display 507 may comprise a liquid crystal display or a light emitting diode display, for example.

The display device 130 may also comprise a receiver 504 coupled to the bus system 503. The receiver 504 may be configured to allow for reception of data from the HDR/WCG encoding system 110 over the distribution system 120. The receiver 504 may be configured to receive the bitstream comprising the encoded Rec. 709 video content and the encoded luma gain factor/color vector information described herein. The receiver 504 may also be configured to receive the metadata from the HDR/WCG encoding system 110.

Although a number of separate components are shown in FIG. 5, one or more of the components may be combined or commonly implemented. Further, each of the components shown in FIG. 5 may be implemented using a plurality of separate elements.

Figure 6:
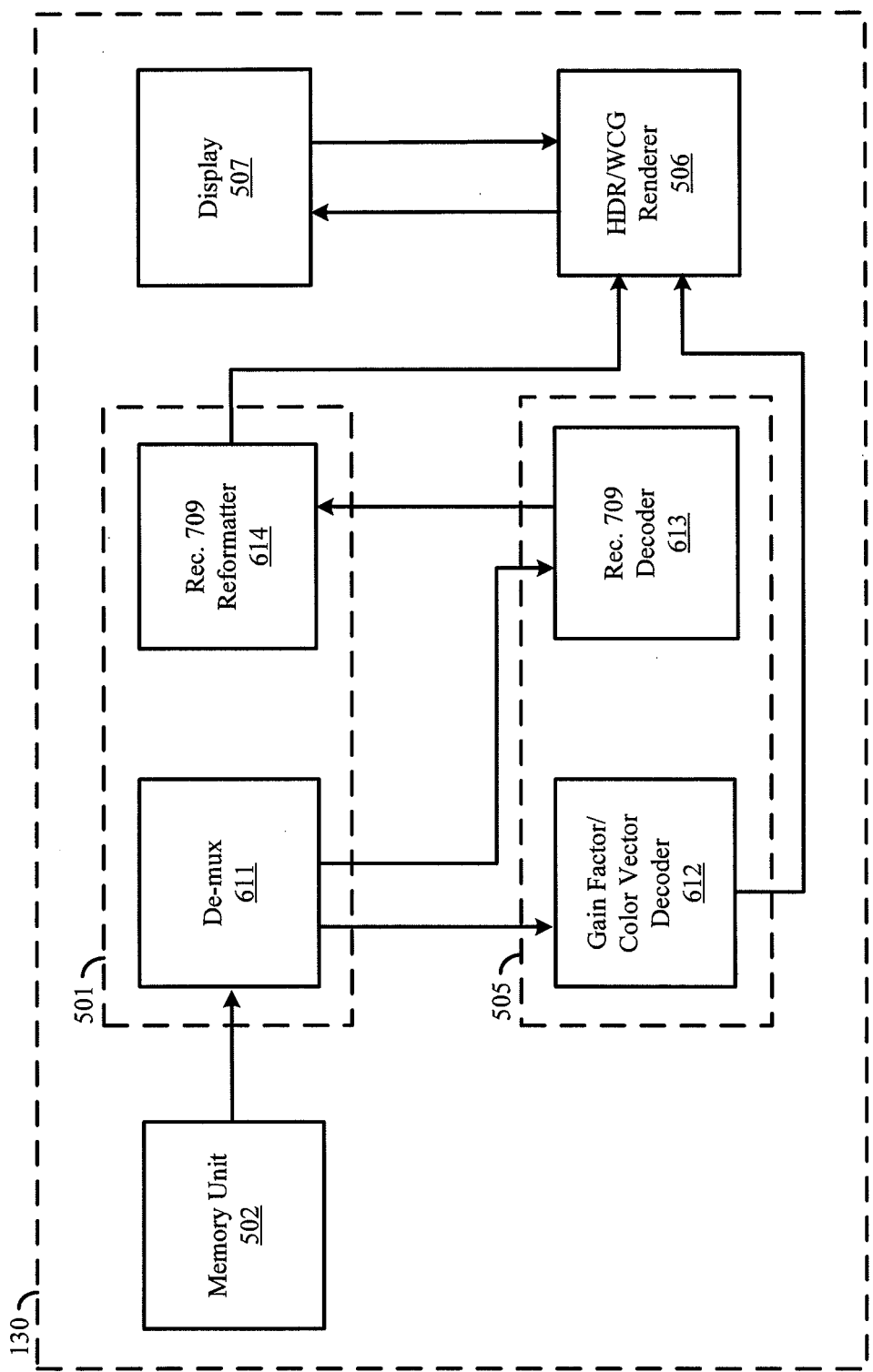
FIG. 6 is a functional block diagram the display device components of FIG. 5, in accordance with exemplary embodiments of the invention.

FIG. 6 is a functional block diagram the display device components of FIG. 5, in accordance with exemplary embodiments of the invention. The processor 501 may comprise a de-multiplexor ("de-mux") 611 configured to receive the bitstream comprising the encoded Rec. 709 video content and the encoded luma gain factor/color vector information from the memory unit 502. The de-multiplexor 611 may be configured to separate the received bitstream into the encoded Rec. 709 video content and the encoded luma gain factor/color vector information.

The video decoder 505 may comprise a gain factor/color vector decoder 612 configured to receive the encoded luma gain factor/color vector information from the de-multiplexer 611. The gain factor/color vector decoder 612 may be configured according to the AVC/H.264 or the HEVC/H.265 coding standard, for example. The gain factor/color vector decoder 612 may be configured to decode the luma gain factor/color vector information.

The video decoder 505 may also comprise a Rec. 709 decoder 613 configured to receive the encoded Rec. 709 video content from the de-multiplexer 611. The Rec. 709 decoder 613 may be configured according to the AVC/H.264 or the HEVC/H.265 coding standard, for example. The Rec. 709 decoder 613 may be configured to decode the Rec. 709 video content.

The processor 501 may also comprise a Rec. 709 reformatter 614 configured to receive the decoded Rec. 709 video content from the Rec. 709 decoder. The Rec. 709 reformatter 614 may be configured to convert the Rec. 709 video content to the same color space as the luma gain factor/color vector information as further described below with reference to FIG. 7. The Rec. 709 reformatter 614 may be further configured to provide the reformatted Rec. 709 video content to the HDR/WCG renderer 506. The Rec. 709 reformatter 614 is described in further detail below with reference to FIG. 7.

The HDR/WCG renderer 506 may be configured to receive the decoded luma gain factor/color vector information from the gain factor/color vector decoder 612. The HDR/WCG renderer 506 is further configured to receive the reformatted and converted Rec. 709 video content from the Rec. 709 reformatter 614. The HDR/WCG renderer 506 may be configured to adjust the Rec. 709 video content based on the luma gain factor/color vector information. As such, the HDR/WCG renderer 506 may provide video content having an increased dynamic range and a wider color gamut compared to the Rec. 709 video content. The HDR/WCG renderer 506 may be further configured to adjust the Rec. 709 video content based on at least one of the range limit information (i.e., color reproduction capability information), viewing condition information, and viewer preference information as further described below. The HDR/WCG renderer 506 is described in further detail below with reference to FIG. 8.

The display device 130 may also comprise a display 507. The display 507 may comprise a computer monitor screen, laptop screen, or a touchscreen, for example. The display 507 may be configured to receive the adjusted video content from the HDR/WCG rendering system 506. The display 507 may be further configured to provide the range limit information, viewing condition information, and viewer preference information to the HDR/WCG renderer 506. The display 507 may be configured to display the adjusted video content. In some embodiments, the display 507 may be external to the HDR/WCG renderer 506.

As described above, the HDR/WCG renderer 506 of the display device 130 is configured to modify the base layer (e.g., Rec. 709 video content) based on the enhancement layer which may be scaled to the rendering capabilities of the display 507. Therefore, different display devices 130 having different rendering capabilities may each appropriately render the same backwards compatible video content to fit their own individual rendering capability. Accordingly, a single distribution system 120 may be used to provide the same backwards compatible video content Rec. 709 capable display devices 130, full HDR/WCG capable display devices, and display devices 130 having any level of capability in between. Distributing a single version of the video content saves computing and distributing resources compared to alternative systems that generate and distribute different variations of video content to display devices 130 of differing capabilities.

Figure 7:
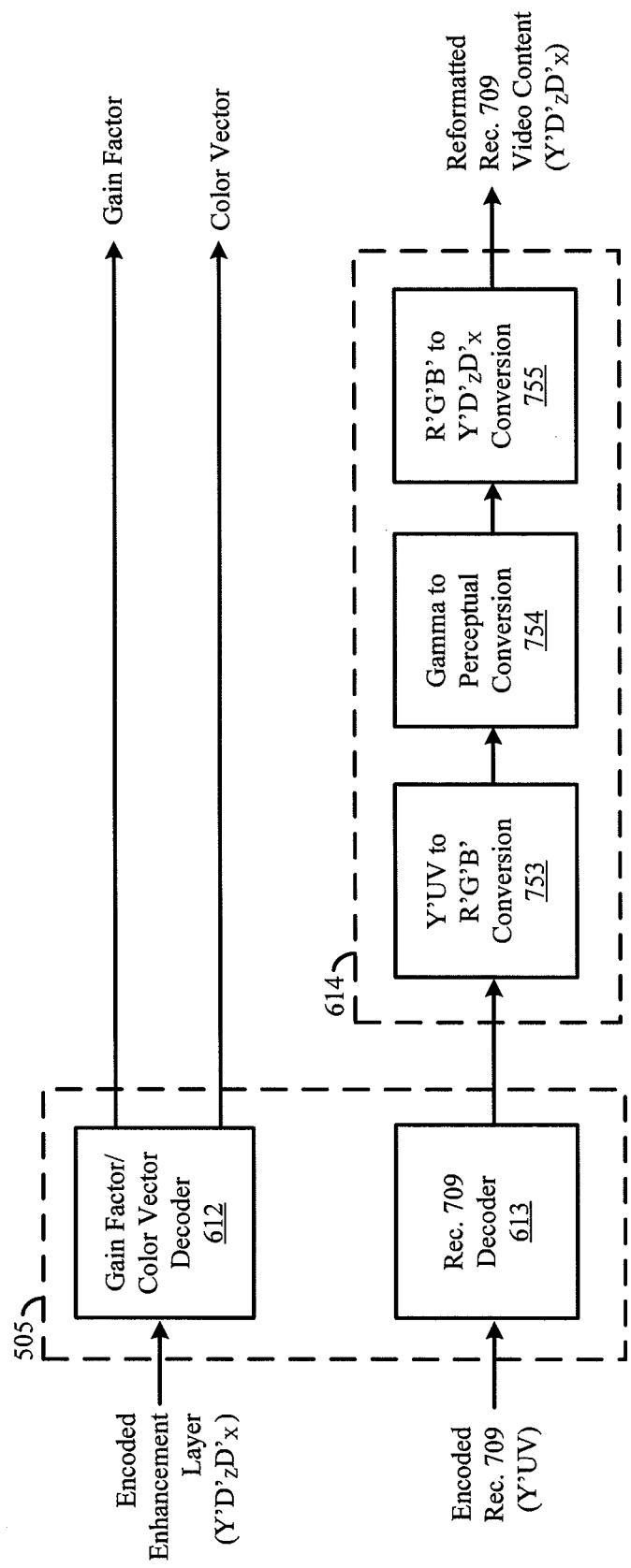
FIG. 7 is a functional block diagram of the video decoder and the Rec. 709 reformatter of FIG. 6, in accordance with exemplary embodiments of the invention.

FIG. 7 is a functional block diagram of the video decoder 505 and the Rec. 709 reformatter 614 of FIG. 6, in accordance with exemplary embodiments of the invention. The Rec. 709 reformatter 614 may be implemented as a functional unit operating on the processor 501 or it may be implemented as a discrete hardware circuit. As described above, the gain factor/color vector decoder 612 may be configured to receive and decode the encoded enhancement layer comprising the luma gain factor/color vector information. The decoded luma gain factor information may comprise luma gain factors and the decoded color vector information may comprise color vectors. The gain factor/color vector decoder 612 may be configured to provide the luma gain factors and color vectors to the HDR/WCG renderer 506.

As described above, the Rec. 709 decoder 613 may be configured to receive and decode the encoded Rec. 709 video content. The decoded Rec. 709 video content may comprise luma (Y') and chroma (UV) components. The Rec. 709 decoder 613 may provide the decoded Rec. 709 video content to the Rec. 709 reformatter 614 as described above.

The Rec. 709 reformatter 614 may comprise a Y'UV to R'G'B' conversion component 753 configured to receive the luma (Y') and chroma (UV) components from the Rec. 709 decoder 613. The Y'UV to R'G'B' conversion component 753 may be configured to convert the luma and chroma components to an R'G'B' color space using a matrix function.

The Rec. 709 reformatter 614 may also comprise a gamma to perceptual conversion component 754 configured to receive the R'G'B' color components from the Y'UV to R'G'B' conversion component 753. The gamma to perceptual conversion component 754 may be configured to convert the R'G'B' color components such that a gamma encoding of the color components of the Rec. 709 video content may be removed and replaced with perceptual coding. It is advantageous to use perceptual coding because it is capable of representing colors of both the Rec. 709 and the HDR/WCG video content sources.

The Rec. 709 reformatter 614 may also comprise an R'G'B' to $Y'D'_ZD'_X$ conversion component 755 configured to receive the perceptual coded luma and chroma components of the Rec. 709 video content from the gamma to perceptual conversion component 754. The R'G'B' to $Y'D'_ZD'_X$ conversion component 755 may be configured to convert the luma and chroma components to an $Y'D'_ZD'_X$ color space. The R'G'B' to $Y'D'_ZD'_X$ conversion component 755 may be further configured to provide the $Y'D'_ZD'_X$ luma and chroma components to the HDR/WCG renderer 506 as described above.

As stated above, the luma and chroma reformatting component 313 may be configured to convert the HDR/WCG video content and the Rec. 709 video content to a common color space (e.g., the $Y'D'_ZD'_X$ color space). As such, the luma gain factor and color vector information generated by the luma and chroma reformatting component 313 is in the $Y'D'_ZD'_X$ color space. The HDR/WCG renderer 506 of the display device 130 may be configured to operate in the same color space as the corresponding luma and chroma reformatting component 313 of the HDR/WCG encoding system 110. Accordingly, the display device 130 may be configured to decode and convert the Rec. 709 video content to the $Y'D'_ZD'_X$ by the process described above.

Figure 8:
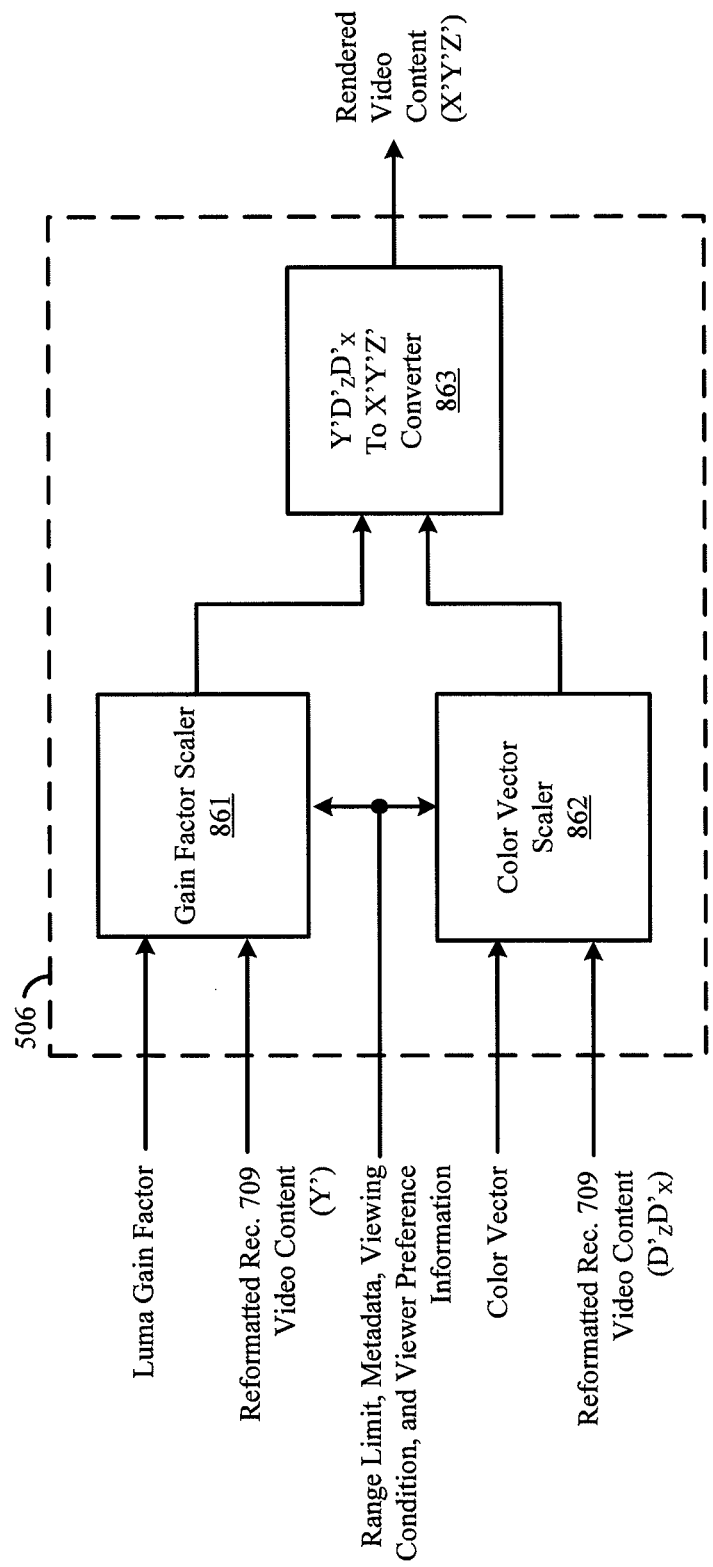
FIG. 8 is a functional block diagram of the high dynamic range/wide color gamut renderer of FIG. 6, in accordance with exemplary embodiments of the invention.

FIG. 8 is a functional block diagram of the HDR/WCG renderer 506 of FIG. 6, in accordance with exemplary embodiments of the invention. The HDR/WCG renderer 506 may be implemented as a functional unit operating on the processor 501 or it may be implemented as a discrete hardware circuit. As described above, the HDR/WCG renderer 506 may be configured to receive the decoded and reformatted Rec. 709 video content comprising the Y' luma component and the $D'_ZD'_X$ chroma component from the Rec. 709 reformatter 614. The HDR/WCG renderer 506 may also be configured to receive the luma gain factors, and the color vectors from the gain factor/color vector decoder 612. As described above, the HDR/WCG renderer 506 may be configured to receive range limit information indicating dynamic range and color gamut limitations from the display 507. The display 507 may provide the range limit information limits internally. In some embodiments the HDR/WCG renderer 506 may be external to the display 507 and the display 507 may provide the range limit information to the HDR/WCG renderer 506 over a digital interface, for example, a high definition multimedia interface (HDMI). As further described below, the HDR/WCG renderer 506 may be configured to output display data to fit a capability of the display 507 based on the range limit information.

The HDR/WCG renderer 506 may be further configured to receive the metadata from the receiver 504. As described above, the HDR/WCG encoding system 110 transmits the metadata which indicates the dynamic range and the color gamut of the reference display used in the content creation process for the Rec. 709 video content and the HDR/WCG video content. The HDR/WCG renderer 506 may be further configured to receive viewing condition, viewing environment, and viewer preference information.

The HDR/WCG renderer 506 may comprise a gain factor scaler 861 configured to receive the luma gain factors, the Y' (luma) component of the reformatter Rec. 709 video content. The gain factor scaler may be further configured to receive the range limit, metadata, viewing condition, and viewer preference information. The gain factor scaling component 861 may be configured scale the Y' component of the reformatted Rec. 709 video content based on the gain factor and the range limit information. The gain factor scaler 861 may be further configured to scale the Y' component of the reformatted Rec. 709 video content based on any combination of the metadata, the range limit information, the viewing condition information, and the viewer preference information.

For example, the gain factor scaler 861 may receive metadata indicating that the Rec. 709 video content has a maximum white level of 100 nits and that the HDR/WCG video content has a maximum white level of 10,000 nits. Furthermore, the gain factor scaler 861 may receive range limit information from the display 507 indicating that the display 507 is capable of producing a maximum white level of 1,000 nits, one tenth of the maximum white level of the HDR/WCG video content. Accordingly, the gain factor scaler 861 may scale the luma gain factor down to one tenth of its original value. The gain factor scaler 861 may then multiply the luma value of the reformatted Rec. 709 video content by the scaled luma gain factor to determine an adjusted luma value for rendering. As such, the gain factor scaler 861 provides luma components that are scaled to match the rendering capabilities of the display 507.

The HDR/WCG renderer 506 may also comprise a color vector scaler 862 configured to receive the $D'_ZD'_X$ color vectors from the gain factor/color vector decoder 612. The color vector scaler 862 may also be configured to receive the $D'_ZD'_X$ chroma component of the reformatted Rec. 709 video content from the Rec. 709 reformatter 514. The color vector scaler may be further configured to receive the range limit, metadata, viewing condition, and viewer preference information. The color vector scaler 862 may be configured to scale the reformatted Rec. 709 $D'_ZD'_X$ chroma component based on the color vector and the range limit information. The color vector scaler 862 may be further configured to scale the reformatted Rec. 709 $D'_ZD'_X$ chroma component based on any combination of the metadata, the viewing condition information, and the viewer preference information.

For example, the color vector scaler 862 may receive metadata and range limit information indicating that the display 507 is capable of reproducing up to 50% of the difference between the color gamut of the HDR/WCG video content and the Rec. 709 video content. Accordingly, the color vector scaler 863 may scale the color vector down to half of its original value. The color vector scaler 862 may add the scaled color vector to the chroma coordinates of the reformatted Rec. 709 video content to determine an adjusted chroma coordinate for rendering. As such, the color vector scaler 862 provides chroma components that are scaled to match the rendering capabilities of the display 507.

In one embodiment, the gain factor scaler 861 may be configured to progressively scale the Y' luma components of the reformatted Rec. 709 video content according to the luma gain factors to fit within a brightness limit of the display 507 and the color vector scaler 862 may be configured to equally scale the $D'_ZD'_X$ chroma components of the reformatted Rec. 709 video content according to the color vectors to fit within a color limit of the display 507. Progressive scaling may reduce large gain factors more than smaller gain factors. In this embodiment, the HDR/WCG renderer 506 may adjust certain colors of the $Y'D'_ZD'_X$ video content that are outside of the Rec. 709 color space, but within the color range capabilities of the display device 130.

In another embodiment, the gain factor scaler 861 and the color vector scaler 862 may be configured to scale only those colors of the $Y'D'_ZD'_X$ video content that are out of the color range of the display 507. It is desirable to avoid the appearance of hard clipping the colors that are outside of the color range of the display 507. Accordingly, both the gain factor scaler 861 and the color vector scaler 862 may be configured to perform soft clipping as described below to scale colors near the range limits of the display 507. In some embodiments, the color vectors may define a straight line from the Rec. 709 video content color to the enhanced WCG color. The color vector scaler 862 may be configured to define curves to adjust the color vector paths (from straight lines) to more accurately model the perception of hue. In some embodiments, the gain factor scaler 861 may perform nonlinear scaling to adjust the gain factors to give the appearance of soft clipping of the luminance levels. In this embodiment, luminance levels above the limits of the display 507 may be reduced more than levels that fall within the range of the display 507, but outside of the Rec. 709 range. The gain factor scaler 861 may be configured to not scale luma gain factors of less than one since they may represent luma information lost in the Rec. 709 video content.

The HDR/WCG renderer 506 may also comprise a $Y'D'_ZD'_X$ to X'Y'Z' converter 863 configured to receive the scaled Y' luma components of the video content from the gain factor scaler 861 and the scaled $D'_ZD'_X$ components of the video content from the color vector scaler 862. The $Y'D'_ZD'_X$ to X'Y'Z' converter 863 may be configured to convert the scaled video content back to the X'Y'Z' color space from the $Y'D'_ZD'_X$ color space using an addition process. The $Y'D'_ZD'_X$ to X'Y'Z' converter 863 may output the scaled video content in the X'Y'Z' color space to be displayed by the display 507, which may be configured to display images in the X'Y'Z' color space.

As discussed above, the HDR/WCG renderer 506 may be configured to receive metadata, viewing condition information, and viewer preference information. If this information is received, the gain factor scaler 861 and the color vector scaler 862 may be further configured to scale the luma component and the chroma components, respectively, based on the metadata, viewing condition, and viewer preference information. For example, the viewing condition information may indicate a bright viewing environment and the gain factor scaler 861 may be configured to scale the luma components up to the limits of the display 507 to compensate for the room lighting. In another example, the viewer preference information may indicate a preference for a more or less dynamic/vivid looking image and the gain factors and the color vectors may be modified accordingly.

As discussed above, the metadata may indicate the maximum dynamic range and color volume of the HDR/WCG video content. The metadata may facilitate rendering of the decoded HDR/WCG content at the display device 130. The metadata may be repeatedly transmitted at regular intervals to allow for its recovery when video content is viewed midstream. If the metadata does not exist, then the maximum dynamic range and color volume information may be derived from the decoded content. These limits are then compared to the limits of the display 507. If they are below the limits of the display 507, then the decoded HDR/WCG images can be delivered to the display without modification. If the content limits are beyond the capabilities of the display 507, then the decoded HDR/WCG images need to be scaled to fit within the display's range as discussed above.

In another embodiment, both the HDR/WCG encoding system 110 and the HDR/WCG renderer 506 of the display device 130 may be used in digital cinema applications. In this embodiment, video content may be encoded and decoded using a JPEG2000 (12-bit XYZ) codec. In this embodiment, the color space used by the HDR/WCG encoding system 110 and the display device 130 may conform to the P3 color space, which may be used in digital light processing (DLP) projectors in theaters and in cinema post-production. The P3 color space may have a reference white level of 48 nits. In this embodiment, the gain factor/color vector encoder 314 may comprise a JPEG2000 compliant encoder configured to encode luma gain factor information and color vector information for each pixel of the video content. In this embodiment, 4:4:4 sampling may be used in the encoding process. In this embodiment, the HDR/WCG renderer 506 may be configured similar to the HDR/WCG renderer 506 described above with reference to FIG. 8. By scaling video content according to the gain factor and color vector information, this embodiment may allow for content creation and projection technology to evolve over time by not locking the content and theatrical display to a reference projector. It also allows for the generated HDR/WCG video content to maintain an artistic intent of the content creator.

In summary, the display device 130 receives and decodes the backwards compatible HDR/WCG video content, from the HDR/WCG encoding system 110, comprising the Rec. 709 video content and the enhancement layer. The Rec. 709 reformatter 614 of the display device 130 converts the Rec. 709 video content to the color space of the enhancement layer. Then the HDR/WCG renderer 506 of the display device 130 scales the luma gain factors and the color vectors of the enhancement layer based on metadata and range limit information. Then the HDR/WCG renderer 506 adjusts the luma components of the Rec. 709 video content based on the scaled luma gain factors. The HDR/WCG renderer 506 further adjusts the chroma components of the Rec. 709 video content based on the color vectors. Then the HDR/WCG renderer 506 converts the adjusted video content to the color space for displaying on the display 507. As such, the display device 130 may display video content that has a higher dynamic range and wider color gamut compared to the Rec. 709 video content, up to the limits of its rendering capabilities.

Figure 9:
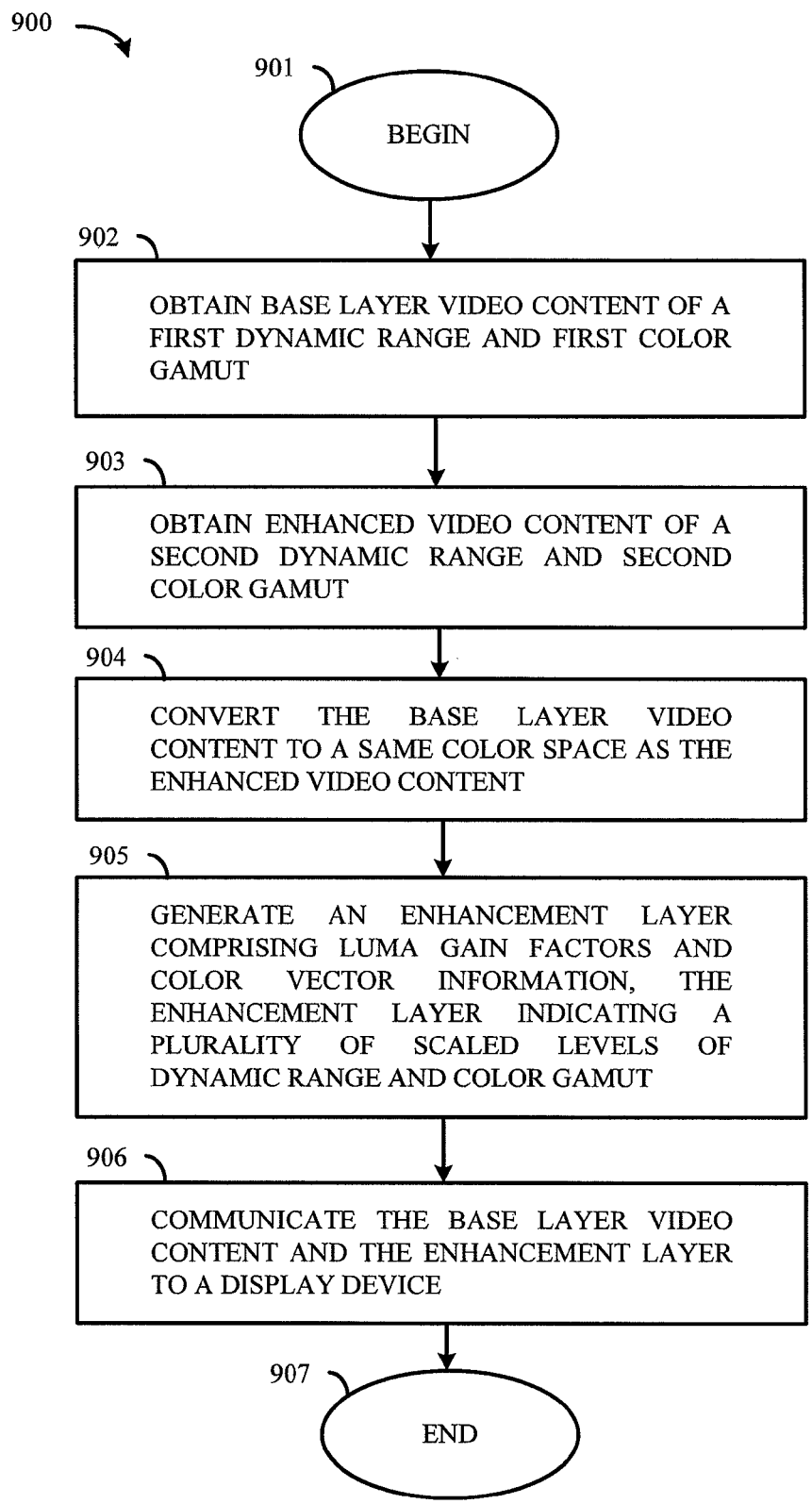
FIG. 9 shows a flow chart of a method for communicating backwards compatible video content to a display device, in accordance with exemplary embodiments of the invention.

FIG. 9 shows a flow chart of a method 900 for communicating backwards compatible video content to a display device, in accordance with exemplary embodiments of the invention. At step 900, the method begins. At step 902, the method may obtain base layer video content of a first dynamic range and first color gamut. At step 903, the method may obtain enhanced video content of a second dynamic range and second color gamut. The second dynamic range may be higher than the first dynamic range and the second color gamut may be wider than first color gamut.

At step 904, the method may convert the base layer video content to a same color space as the enhanced video content. The base layer video content may be converted by a luma and chroma reformatting process as described above with reference to FIG. 4. At step 905, the method may generate an enhancement layer comprising luma gain factors and color vector information. The enhancement layer may be generated by luma gain factor calculations and color vector calculation as described above with reference to FIG. 4.

At step 906, the method may communicate the base layer video content and the enhancement layer to a display device. The base layer video content and the enhancement layer may be multiplexed into a single bitstream and transmitted via a distribution network as described above with reference to FIG. 3A. At step 907, the method ends.

The following embodiments provide additional or alternative features that may be implemented in any of the HDR/WCG encoding or decoding systems described above, either in addition to or in the place of a component of the system.

One embodiment provides a layered encoding and decoding method for high dynamic range and wide color gamut video content that encodes a low dynamic range and narrow color gamut base layer creatively adjusted for conventional displays and codes creatively adjusted luminance gain and color vector information in additional layers to allow for rendering to displays with extended brightness and color range capabilities. The method above uses existing video compression encoding and decoding standards where the base layer is backwards compatible to existing content delivery methods. The encoder accepts an HDR and WCG source and a standard video source where both can represent the artistic intent of the content creator. Both sources are converted to the same color representation through a reformatting process. The color representation has a luminance component and two color components that do not include luminance information. A gain factor is calculated for every pixel by dividing the luminance component of the HDR/WCG source by the luminance component derived from the standard video source. The minimum luminance value of the base component should be represented by a positive non-zero number. A 2-dimensional color vector is calculated for every pixel by subtracting each of the chrominance components derived from the HDR/WCG source by the chrominance components derived from the standard video source. The luminance gain factors may undergo a spatial or temporal filtering process to create smoother transitions before encoding. The color vectors may undergo a subsampling process to fit within a 4:2:0 or 4:2:2 encoding structure. The luminance gain factors and color vectors are encoded by a standard video encoder where the gain factors are processed as luma information and the color vectors are processed as chroma information. Optionally, an average value of the gains factors may be computed at the block level of encoding and only the differential with the average is coded along with the average value. Optionally, if the standard video chrominance values in a coding block are zero values or near zero values, the quantization process may be altered to represent a more limited range. Optionally, for regions where the luminance gain factors are above a set threshold, the encoding quantization of the standard video luma information in that region may be reduced.

In one embodiment, a dual channel standard decoder will recover luminance gain factors, color vectors, and the base layer luma and chroma data which are converted to the same color representation as the luminance gain factors and color vectors. A full HDR/WCG output is formed by multiplying the base layer luminance by the luminance gain factors, adding the color vectors to the base layer chrominance, upscaling the chrominance if it was subsampled, and converting the resulting luminance and chrominance to the desired color space for display. A reduced HDR/WCG output is formed by scaling the luminance gain factors before multiplying them by the base layer luminance, the color vectors are scaled before adding them to the base layer chrominance, upscaling the chrominance if it was subsampled, and converting the resulting luminance and chrominance to the desired color space for display. The scale factors are determined from a comparison of the range limits of the target display and the range limits of the HDR/WCG source. The base layer luminance and chrominance limits are the lower bound of the scaled display range. Optionally, the luminance gains factors that are greater than one are progressively scaled and the color vectors are equally scaled. Optionally, the luminance gain factors that are greater than one are scaled in a nonlinear manner to represent a soft clipping process. The luminance gain factors that are equal to or less than one are not scaled. Optionally, only the color vectors that are outside of the target display range are scaled. Optionally, the color vectors are scaled in a nonlinear manner to represent a soft clipping process. Optionally, the path of a color vector is defined as a curve rather than a straight line. Rendering may be modified by first scaling the base layer luminance and then applying one of the above processes to adjust to room lighting or viewer preference. Rendering may be modified by increasing the scale factor(s) and then applying one of the above processes to create a more dynamic image according to viewer preference.

In one embodiment, an HDR/WCG encoding system may be configured to receive HDR/WCG video content and define at least one of a tone mapping operator and a gamut mapping operator for the HDR/WCG video content.

The HDR/WCG encoding system may define the tone mapping operator and the gamut mapping operator either globally or for each scene of the HDR/WCG video content. In this embodiment, the HDR/WCG encoding system may be configured to generate Rec. 709 video content based on the received HDR/WCG video content and the tone and gamut mapping operators. For example, HDR/WCG encoding system may be configured to use the tone and gamut mapping operators to map colors in an HDR/WCG color space down to the lower Rec. 709 color space. The HDR/WCG encoding system may comprise a decoder configured to receive the generated Rec. 709 video content and an indication of the tone and gamut mapping operators from the HDR/WCG encoding system. The decoder device may perform inverse tone and gamut mapping operations on the Rec. 709 video content based on the indicated tone and gamut mapping operators. The HDR/WCG encoder may be further configured to generate residue information by subtracting an output of the decoder (i.e., the inverse tone and gamut mapped Rec. 709 video content) from the HDR/WCG source. The HDR/WCG encoding system may be configured to code the residue information. The HDR/WCG encoding system may be configured to provide a display device with the encoded Rec. 709 video content, the encoded residue information, and an indication of the tone and gamut mapping operations. The Rec. 709 video content and the residue information may be coded using conventional means (e.g., HEVC or AVC coding). The features of this embodiment may be practical for real-time broadcasts.

In another embodiment, an HDR/WCG encoding system may receive an HDR/WCG video content source and a Rec. 709 video content source. The HDR/WCG encoding system may be configured to determine at least one of an inverse tone mapping operator and an inverse gamut mapping operator that indicate a predicted HDR/WCG video content based on the Rec. 709 video content. The HDR/WCG encoding system may be configured to generate and code residual information based on differences between the predicted HDR/WCG video content and the received HDR/WCG video content. A size of the residual information may depend on a content creation process for both the HDR/WCG video content and the Rec. 709 video content. It is desirable for the size of the coded residual information to be small. Where the content creation process may be controlled, the residual information may be small and may accurately predict the HDR/WCG video content. This configuration is beneficial because inaccurate prediction of the HDR/WCG video content based on the residual information may produce undesirable artifacts when the HDR/WCG video content is decoded.

In one embodiment, a conventional encoder (e.g., an HEVC encoder) may be configured to receive and code only an HDR/WCG video content source. The encoder may include metadata that indicates a range of a reference display used in a content creation process. This embodiment may not be capable of being rendered by a Rec. 709 capable display device.

In one embodiment, an HDR/WCG encoding system may be configured to receive an HDR source image and generate a lower dynamic range (LDR) image by tone mapping the HDR source image. The HDR/WCG encoding system encoder may be configured to calculate a ratio image by dividing a luminance of the HDR by a luminance of the LDR image. The HDR/WCG encoding system may be configured to transform the ratio image by a nonlinear function and encode the transformed ratio image. In some embodiments, the LDR image may be JPEG encoded and the ratio image may be compressed and ASCII coded and stored in a JPEG file.

In one embodiment, an HDR/WCG encoding system may be configured to receive a standard dynamic range (SDR) source image. The HDR/WCG encoding system may be configured to encode and decode the SDR source image and perform an inverse tone mapping process on the SDR source image. A result of the inverse tone mapping process may be subtracted from an HDR source image corresponding to the SDR source image to generate residual information. The HDR/WCG encoding system may be configured code the residual information to generate an enhancement bitstream indicating the HDR source image based on the SDR source image.

In one embodiment, a HDR/WCG encoding system may be configured to predict an HDR source from a low dynamic range (LDR) source. The HDR/WCG encoding system may use an encoded, and at least partially decoded, LDR source block to predict a corresponding HDR source block by scaling and offsetting the LDR luma and chroma data. The HDR/WCG encoding system may be configured to code a difference between the predicted block and the source block as residual information. A decoding system may be configured to recover the HDR source based on the LDR source and the residual information.

In one embodiment, an HDR/WCG encoding system may be configured to code a visual dynamic range (VDR) source. The VDR source may be configured to represent 5-6 orders of magnitude of dynamic range. The HDR/WCG encoding system may be configured to derive tone mapping information from the VDR source and an encoded/decoded LDR source. The HDR/WCG encoding system may be configured to perform an inverse tone mapping operation on the LDR source. The HDR/WCG encoding system may be configured to calculate residual information based on a difference between the inverse tone mapped LDR source and the VDR source. The HDR/WCG encoding system may be further configured to adjusting the LDR source based on a de-contouring process, which may reduce a size of the residual information. The de-contouring process may operate in the Logluv color space, which provides 32 bits per pixel and color channels without luminance information. The HDR/WCG encoding system may be configured to generate a bitstream that may include the modified LDR source, the tone mapping information, and the residual information.

In one embodiment, an HDR/WCG encoding system may be configured to apply a tone mapping function to an HDR content source to create an LDR source. The HDR/WCG encoding system may be configured to determine an inverse tone mapping operator by area. The HDR/WCG encoding system may be configured to predict the HDR source based on the inverse tone mapping operator. The HDR/WCG encoding system may be configured to determine the difference between the HDR source and the predicted HDR content. The HDR/WCG encoding system may be configured to code the difference between the HDR source and the predicted HDR content as residual information.

In one embodiment, an HDR/WCG encoding system may be configured to apply a mapping function to an LDR source to predict the HDR source. Mapping parameters of the mapping function may be based on at least one of spatial regions and temporal regions. The HDR/WCG encoding system may be configured to generate residual information by subtracting the predicted HDR image from the source HDR image. The HDR/WCG encoding system may also generate the residual information by dividing the source HDR image by the predicted HDR image. A bitstream generated by the HDR/WCG encoding system may comprise the coded LDR source, the mapping parameters, and the coded residual information.

In one embodiment, an HDR/WCG encoding system may be configured to receive an HDR source and an SDR (baseline) source. The HDR/WCG encoding system may be configured to compute and code a ratio of a luminance component of the HDR source and a luminance component of the SDR source. The HDR/WCG encoding system may be configured to code a log value of the luminance ratio. The HDR/WCG encoding system may be configured to calculate and code a chrominance residual between the HDR and SDR sources. A decoder may be configured to generate the HDR source based on the SDR source, the log value of the luminance ratio, and the chrominance residual.

In one embodiment, an HDR/WCG encoding system may be configured to perform a layered process to code still images. The HDR/WCG encoding system may define a tone mapping operator which may be used to create a tone mapped base layer. The HDR/WCG encoding system may be configured to calculate a ratio image by dividing a luminance of an HDR source by a luminance of the base layer. The HDR/WCG encoding system may be configured to generate residual information by dividing the HDR source by the ratio image and subtracting an image of the base layer. The HDR/WCG encoding system may be configured to code the base layer, the ratio image, and the residual information as a JPEG-HDR image.

In one embodiment, an HDR/WCG encoding system may be configured to receive two source image sequences comprising different dynamic ranges and generate a global and a local tone mapping prediction. The HDR/WCG encoding system may be configured to calculate residual information based on the two source image sequences and the global and local tone mapping predictions. The HDR/WCG encoding system may be configured to code the residual information with the tone mapping predictions.

In one embodiment, a HDR/WCG encoding system may be configured to apply a bilateral filter to an HDR source to remove detail. The HDR/WCG encoding system may be configured to apply a tone mapping operator to the HDR source to create an LDR base layer. The HDR/WCG encoding system may be configured to generate a detail layer by subtracting the filtered HDR source from the HDR source. The HDR/WCG encoding system may also be configured to generate a detail layer by dividing the HDR source by the filtered HDR source. The HDR/WCG encoding system may be configured to encode the base layer and the detail later using a conventional encoder. The HDR/WCG encoding system may be configured to package the encoded base layer and the encoded detail layer together with parameters of the tone mapping operator. A decoder may be configured to adjust the tone mapping parameters to match the properties of a display device.

In some of the embodiments above, where a tone/gamut mapping or inverse tone/gamut mapping is a global function, the ability to represent spatially localized variations of the video content may be limited. Furthermore, it is desirable to maintain an artistic intent of a creator of source video content. In some embodiments, an inverse tone/gamut mapping function may not generate video content that maintains the artistic intent.

Information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Further, it should be appreciated that modules and/or other appropriate means for performing the methods and techniques described herein can be obtained by the HDR/WCG encoding system and/or the display device as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that the HDR/WCG encoding system and/or the display device can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure may be devised without departing from the basic scope thereof, and the scope thereof is determined by the claims that follow.

What is claimed is:

1. An apparatus for coding video content, comprising:
   a memory unit storing base layer video content of a first dynamic range and a first color gamut and storing enhanced video content of a second dynamic range and a second color gamut, the second dynamic range being higher than the first dynamic range and the second color gamut being wider than the first color gamut; and
   a processing circuit operationally coupled to the memory unit and configured to generate an enhancement layer comprising luma gain factor information and color vector information based on the base layer video content and the enhanced video content, the enhancement layer indicating a plurality of scaled levels of dynamic range and color gamut, wherein the plurality of scaled levels of dynamic range from the first dynamic range to the second dynamic range and the plurality of scaled levels of color gamut range from the first color gamut to the second color gamut, wherein the processing circuit is further configured to communicate the base layer video content and the enhancement layer to a display device.

2. The apparatus for coding video content of claim 1, wherein the display device is capable of rendering video content of a third dynamic range and a third color gamut, the third dynamic range being higher than the first dynamic range and lower than the second dynamic range and the third color gamut being wider than the first color gamut and narrower than the second color gamut, and wherein the enhancement layer indicates scaled video content of the third dynamic range and the third color gamut, the scaled video content being derivable by the display device based on the base layer video content.

3. The apparatus for coding video content of claim 1, wherein the processing circuit is further configured to compress the enhancement layer based on either HEVC or AVC video compression coding standards.

4. The apparatus for coding video content of claim 1, wherein the processing circuit is further configured to convert the base layer video content and the enhanced video content to a common color representation comprising a luma component and first and second chroma components.

5. The apparatus for coding video content of claim 4, wherein the luma component is achromatic and the first and second chroma components do not comprise luminance information.

6. The apparatus for coding video content of claim 1, wherein the luma gain factor information comprises luma gain factor values for each pixel of the base layer video content and the processing circuit is further configured to determine each luma gain factor value by dividing a luma component of the enhanced video content by a luma component of the base layer video content.

7. The apparatus for coding video content of claim 1, wherein the color vector information comprises 2-dimensional color vector values for each pixel of the base layer video content and the processing circuit is further configured to generate each 2-dimensional color vector value by subtracting the first and second chroma components of the base layer video content from the first and second chroma components of the enhanced video content.

8. The apparatus for coding video content of claim 1, wherein the luma gain factor information comprises luma gain factor values for each pixel of the base layer video and the processing circuit is further configured to spatially or temporally filter the luma gain factors.

9. The apparatus for coding video content of claim 1, wherein the color vector information comprises 2-dimensional color vector values for each pixel of the base layer video content and the processing circuit is further configured to subsample the 2-dimensional color vector values using a same encoding structure as the base layer video content.

10. The apparatus for coding video content of claim 1, wherein the processing circuit is further configured to encode the luma gain factor information and the color vector information, the luma gain factor information encoded as luma information and the color vector information encoded as chroma information.

11. The apparatus for coding video content of claim 1, wherein the luma gain factor information comprises luma gain factor values for each pixel of the base layer video and the processing circuit is configured to determine an average value of the luma gain factors and code a differential between the average luma gain factor and the determined luma gain factor along with the average luma gain factor value.

12. The apparatus for coding video content of claim 1, wherein the processing circuit is further configured to determine whether a chroma value of a coding block of the base layer video content is a zero or near zero value and alter a quantization process to represent a more limited range.

13. The apparatus for coding video content of claim 1, wherein the luma gain factor information comprises luma gain factors for each pixel of the base layer video and the processing circuit is configured to define a luma gain factor threshold, determine whether luma gain factor values for a region of the base layer video content surpass the luma gain factor threshold, and reduce an encoding quantization of the base layer video content video in the region.

14. A method for coding video content, comprising:
   obtaining base layer video content of a first dynamic range and a first color gamut and obtaining enhanced video content of a second dynamic range and a second color gamut, the second dynamic range being higher than the first dynamic range and the second color gamut being wider than the first color gamut; and
   generating an enhancement layer comprising luma gain factor information and color vector information based on the base layer video content and the enhanced video content, the enhancement layer indicating a plurality of scaled levels of dynamic range and color gamut, wherein the plurality of scaled levels of dynamic range from the first dynamic range to the second dynamic range and the plurality of scaled levels of color gamut range from the first color gamut to the second color gamut; and
   communicating the base layer video content and the enhancement layer to a display device.

15. The method for coding video content of claim 14, wherein the display device is capable of rendering video content of a third dynamic range and a third color gamut, the third dynamic range being higher than the first dynamic range and lower than the second dynamic range and the third color gamut being wider than the first color gamut and narrower than the second color gamut, and wherein the enhancement layer indicates scaled video content of the third dynamic range and the third color gamut, the scaled video content being derivable by the display device based on the base layer video content.

16. An apparatus for coding video content, comprising:
   means for obtaining base layer video content of a first dynamic range and a first color gamut and obtaining enhanced video content of a second dynamic range and a second color gamut, the second dynamic range being higher than the first dynamic range and the second color gamut being wider than the first color gamut; and
   means for generating an enhancement layer comprising luma gain factor information and color vector information based on the base layer video content and the enhanced video content, the enhancement layer indicating a plurality of scaled levels of dynamic range and color gamut, wherein the plurality of scaled levels of dynamic range from the first dynamic range to the second dynamic range and the plurality of scaled levels of color gamut range from the first color gamut to the second color gamut; and
   means for communicating the base layer video content and the enhancement layer to a display device.

17. The apparatus for coding video content of claim 16, wherein the display device is capable of rendering video content of a third dynamic range and a third color gamut, the third dynamic range being higher than the first dynamic range and lower than the second dynamic range and the third color gamut being wider than the first color gamut and narrower than the second color gamut, and wherein the enhancement layer indicates scaled video content of the third dynamic range and the third color gamut, the scaled video content being derivable by the display device based on the base layer video content.

18. An apparatus for decoding and rendering video content, comprising:
   a memory unit configured to store base layer video content of a first dynamic range and a first color gamut and an enhancement layer comprising luma gain factor information and color vector information, the luma gain factor information indicating a plurality of scaled levels of dynamic range ranging from the first dynamic range to a second dynamic range, the color vector information indicating a plurality of scaled levels of color gamut ranging from the first color gamut to a second color gamut; and
   a processing circuit configured to derive scaled video content of a third dynamic range and a third color gamut based on the base layer video content, the luma gain factor information, and the color vector information, the third dynamic range being higher than the first dynamic range and lower than the second dynamic range, the third color gamut being wider than the first color gamut and narrower than the second color gamut, and configured to render the scaled video content.

19. The apparatus for decoding and rendering video content of claim 18, wherein the processing circuit is further configured to convert the base layer video content and the enhancement layer to a common color representation comprising a luma component and first and second chroma components.

20. The apparatus for decoding and rendering video content of claim 18, wherein the processing circuit is further configured to derive the scaled video content based on viewing environment information and/or viewer preference information.

* * * * *